(12) United States Patent
Beith et al.

(10) Patent No.: US 11,481,931 B2
(45) Date of Patent: Oct. 25, 2022

(54) VIRTUAL PRIVATE SPACE FOR EXTENDED REALITY

(71) Applicant: QUALCOMM Incorporated, San Diego, CA (US)

(72) Inventors: Scott Beith, Carlsbad, CA (US); Robert Tartz, San Marcos, CA (US); Ananthapadmanabhan Arasanipalai Kandhadai, San Diego, CA (US); Gerhard Reitmayr, Del Mar, CA (US); Mehrad Tavakoli, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 16/922,945

(22) Filed: Jul. 7, 2020

(65) Prior Publication Data

US 2022/0012920 A1   Jan. 13, 2022

(51) Int. Cl.
*G06T 11/00* (2006.01)
*G06F 3/14* (2006.01)
*G06F 21/62* (2013.01)
*G08B 3/10* (2006.01)

(52) U.S. Cl.
CPC ............ *G06T 11/00* (2013.01); *G06F 3/1454* (2013.01); *G06F 21/629* (2013.01); *G08B 3/10* (2013.01); *G06F 2221/2141* (2013.01); *G06F 2221/2149* (2013.01)

(58) Field of Classification Search
None
See application file for complete search history.

(56) References Cited

U.S. PATENT DOCUMENTS

| 10,165,261 | B2 | 12/2018 | Valdivia et al. |
| 10,445,523 | B2 | 10/2019 | Clement et al. |
| 10,859,831 | B1* | 12/2020 | Pollard .............. H04N 13/204 |
| 2018/0158053 | A1 | 6/2018 | Adams et al. |
| 2018/0285592 | A1* | 10/2018 | Sharifi .................... G06F 21/84 |

(Continued)

FOREIGN PATENT DOCUMENTS

WO   2018200315 A1   11/2018

OTHER PUBLICATIONS

Reilly et al. ("SecSpace: Prototyping Usable Privacy and Security for Mixed Reality Collaborative Environments").Prototyping and Development Frameworks, EICS'14, Jun. 17-20, 2014 (Year: 2014).*

(Continued)

*Primary Examiner* — Yanna Wu
(74) *Attorney, Agent, or Firm* — Qualcomm Incorporated

(57) ABSTRACT

Systems, methods, and non-transitory media are provided for generating virtual private spaces for extended reality (XR) experiences. An example method can include initiating a virtual session for presenting virtual content and identifying, for the virtual session, a portion of a physical space for use as a virtual private space for presenting at least a portion of the virtual content. The method can include outputting boundary information defining a boundary of the virtual private space, and generate at least the portion of the virtual content for the virtual private space. At least the portion of the virtual content is viewable in the virtual private space by one or more authorized users of the virtual session and is not viewable by one or more unauthorized users.

35 Claims, 10 Drawing Sheets

(56) References Cited

U.S. PATENT DOCUMENTS

2019/0019011 A1    1/2019   Ross et al.
2019/0251722 A1    8/2019   Ross et al.
2019/0362312 A1*   11/2019   Platt .................... G06Q 10/103
2020/0085511 A1*    3/2020   Oezbek ................ A61B 34/10

OTHER PUBLICATIONS

Guzman J.A.D., et al., "Security and Privacy Approaches in Mixed Reality: A Literature Survey", arxiv.org, Cornell University Library, 201 OLIN Library Cornell University Ithaca, NY 14853, Jun. 10, 2020 (Jun. 10, 2020), XP081677851, DOI: 10.1145/3359626, Abstract. Section 3, pp. 1-41.
International Search Report and Written Opinion—PCT/US2021/040089—ISA/EPO—dated Oct. 8, 2021.

* cited by examiner

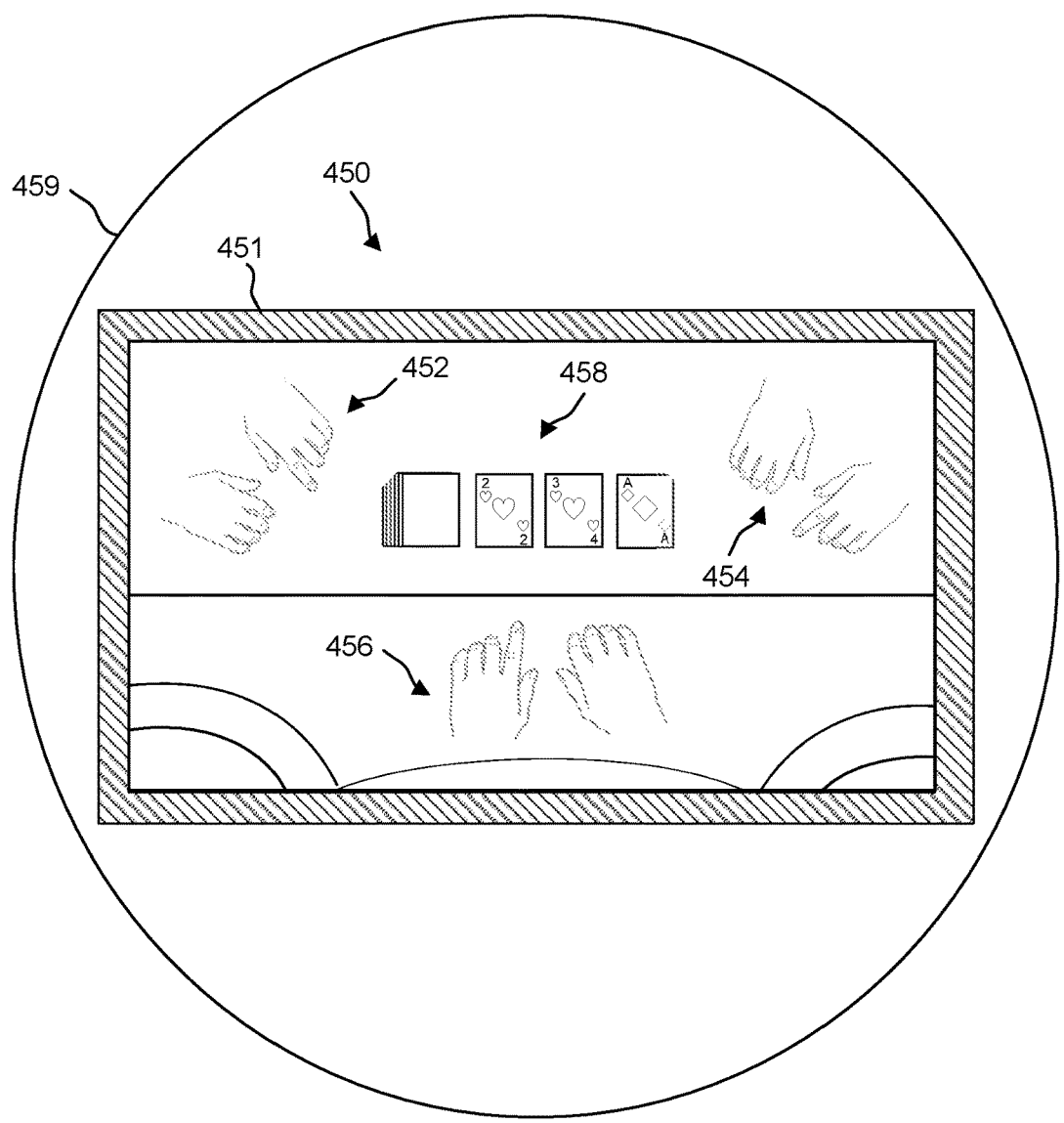
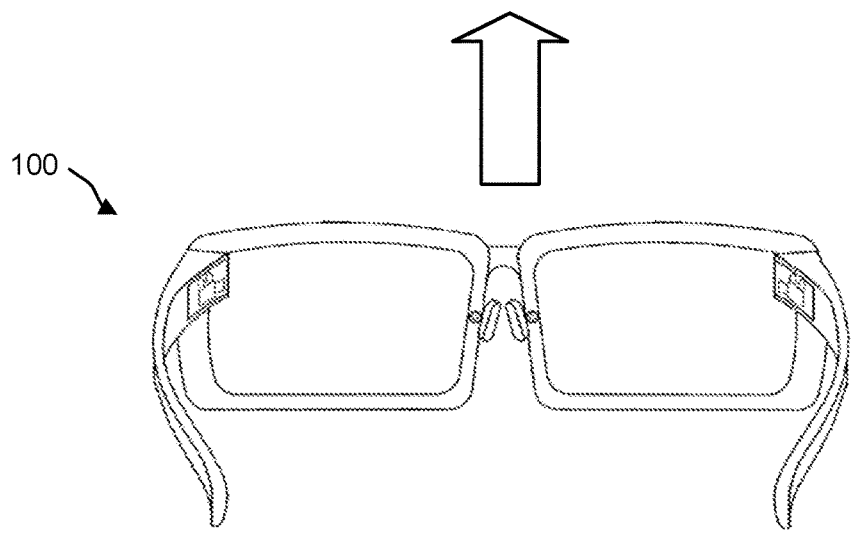
FIG. 4

800

```
┌─────────────────────────────────────────┐
│  INITIATE, BY A DEVICE, A VIRTUAL        │
│  SESSION FOR PRESENTING VIRTUAL CONTENT  │
│                  802                     │
└─────────────────────────────────────────┘
                    │
                    ▼
┌─────────────────────────────────────────┐
│  IDENTIFY, FOR THE VIRTUAL SESSION, A    │
│  PORTION OF A PHYSICAL SPACE FOR USE AS  │
│  A VIRTUAL PRIVATE SPACE FOR PRESENTING  │
│  AT LEAST A PORTION OF THE VIRTUAL       │
│  CONTENT                                 │
│                  804                     │
└─────────────────────────────────────────┘
                    │
                    ▼
┌─────────────────────────────────────────┐
│  OUTPUT BOUNDARY INFORMATION DEFINING A  │
│  BOUNDARY OF THE VIRTUAL PRIVATE SPACE   │
│                  806                     │
└─────────────────────────────────────────┘
                    │
                    ▼
┌─────────────────────────────────────────┐
│  GENERATE AT LEAST THE PORTION OF THE    │
│  VIRTUAL CONTENT FOR THE VIRTUAL PRIVATE │
│  SPACE, AT LEAST THE PORTION OF THE      │
│  VIRTUAL CONTENT BEING VIEWABLE IN THE   │
│  VIRTUAL PRIVATE SPACE BY ONE OR MORE    │
│  AUTHORIZED USERS OF THE VIRTUAL SESSION │
│  AND NOT BEING VIEWABLE BY THE ONE OR    │
│  MORE UNAUTHORIZED USERS                 │
│                  808                     │
└─────────────────────────────────────────┘
```

VIRTUAL PRIVATE SPACE FOR EXTENDED REALITY

TECHNICAL FIELD

The present disclosure generally relates to generating virtual content in virtual private spaces for extended reality and other applications.

BACKGROUND

Extended reality technologies can be used to present virtual content to users, and/or can combine real environments from the physical world and virtual environments to provide users with extended reality experiences. The term extended reality can encompass virtual reality, augmented reality, mixed reality, and the like. Each of these forms of extended reality allows users to experience or interact with immersive virtual environments or content. For example, an extended reality experience can allow a user to interact with a real or physical environment enhanced or augmented with virtual content.

Extended reality technologies can be implemented to enhance user experiences in a wide range of contexts, such as entertainment, healthcare, retail, education, social media, among others.

SUMMARY

Disclosed are systems, apparatuses, methods, and computer-readable media for generating virtual content in virtual private spaces for extended reality experiences. According to at least one example, a method is provided for generating virtual content for one or more virtual private spaces. The method includes: initiating, by a device, a virtual session for presenting virtual content; identifying, for the virtual session, a portion of a physical space for use as a virtual private space for presenting at least a portion of the virtual content; outputting boundary information defining a boundary of the virtual private space; and generating at least the portion of the virtual content for the virtual private space, at least the portion of the virtual content being viewable in the virtual private space by one or more authorized users of the virtual session and not being viewable by one or more unauthorized users.

In another example, an apparatus for generating virtual content for one or more virtual private spaces is provided that includes a memory configured to store virtual content data and one or more processors (e.g., implemented in circuitry) coupled to the memory. The processor is configured to and can: initiate a virtual session for presenting virtual content; identify, for the virtual session, a portion of a physical space for use as a virtual private space for presenting at least a portion of the virtual content; output boundary information defining a boundary of the virtual private space; and generate at least the portion of the virtual content for the virtual private space, at least the portion of the virtual content being viewable in the virtual private space by one or more authorized users of the virtual session and not being viewable by one or more unauthorized users.

In another example, a non-transitory computer-readable medium is provided that has stored thereon instructions that, when executed by one or more processors, cause the one or more processors to: initiate a virtual session for presenting virtual content; identify, for the virtual session, a portion of a physical space for use as a virtual private space for presenting at least a portion of the virtual content; output boundary information defining a boundary of the virtual private space; and generate at least the portion of the virtual content for the virtual private space, at least the portion of the virtual content being viewable in the virtual private space by one or more authorized users of the virtual session and not being viewable by one or more unauthorized users.

In another example, an apparatus for generating virtual content for one or more virtual private spaces is provided. The apparatus includes: means for initiating, by a device, a virtual session for presenting virtual content; means for identifying, for the virtual session, a portion of a physical space for use as a virtual private space for presenting at least a portion of the virtual content; means for outputting boundary information defining a boundary of the virtual private space; and means for generating at least the portion of the virtual content for the virtual private space, at least the portion of the virtual content being viewable in the virtual private space by one or more authorized users of the virtual session and not being viewable by one or more unauthorized users.

In another example, a method for generating virtual content is provided. The method includes: identifying, for a virtual session by one or more processors, a portion of a physical space for use as a virtual private space for presenting virtual content; generating, by the one or more processors, boundary information defining a boundary of the virtual private space, the boundary information being associated with boundary virtual content identifying the boundary for the virtual private space; generating, by the one or more processors, the virtual content for the virtual private space; displaying, by a first extended reality viewing device, the virtual content of the virtual session, the first extended reality viewing device being arranged to receive and display the virtual content; and displaying, by a second extended reality viewing device, the virtual content, the second extended reality viewing device being arranged to receive the boundary information and display the boundary virtual content. In some cases, the second extended reality viewing device does not display the virtual content in the virtual private space.

In another example, an extended reality system is provided. The extended reality system includes: one or more processors configured to: identify, for a virtual session, a portion of a physical space for use as a virtual private space for presenting virtual content; generate boundary information defining a boundary of the virtual private space, the boundary information being associated with boundary virtual content identifying the boundary for the virtual private space; and generate the virtual content for the virtual private space. The extended reality system further includes a first extended reality viewing device, the first extended reality viewing device being authorized to display and/or view the virtual content of the virtual session, the first extended reality viewing device being arranged to receive and display the virtual content. The extended reality system further includes a second extended reality viewing device, the second extended reality viewing device being unauthorized to display and/or view the virtual content, the second extended reality viewing device being arranged to receive the boundary information and display the boundary virtual content, and not displaying the virtual content in the virtual private space. In some examples, the one or more processors are part of the first extended reality viewing device.

In another example, a non-transitory computer-readable medium of an extended reality system is provided that has stored thereon instructions that, when executed by one or more processors, cause the one or more processors to:

identify, for a virtual session by one or more processors, a portion of a physical space for use as a virtual private space for presenting virtual content; generate boundary information defining a boundary of the virtual private space, the boundary information being associated with boundary virtual content identifying the boundary for the virtual private space; and generate the virtual content for the virtual private space. A non-transitory computer-readable medium of a first extended reality viewing device is provided that has stored thereon instructions that, when executed by one or more processors, cause the one or more processors to display the virtual content of the virtual session, the first extended reality viewing device being arranged to receive and display the virtual content. A non-transitory computer-readable medium of a second extended reality viewing device is provided that has stored thereon instructions that, when executed by one or more processors, cause the one or more processors to display the virtual content, the second extended reality viewing device being arranged to receive the boundary information and display the boundary virtual content. In some cases, the second extended reality viewing device does not display the virtual content in the virtual private space.

In another example, an extended reality system is provided. The extended reality system includes: means for identifying, for a virtual session by one or more processors, a portion of a physical space for use as a virtual private space for presenting virtual content; means for generating boundary information defining a boundary of the virtual private space, the boundary information being associated with boundary virtual content identifying the boundary for the virtual private space; means for generating the virtual content for the virtual private space; a first means for displaying the virtual content of the virtual session, the first means for displaying being arranged to receive and display the virtual content; and a second means for displaying the virtual content, the second means for displaying being arranged to receive the boundary information and display the boundary virtual content. In some cases, the second means for displaying does not display the virtual content in the virtual private space.

In some aspects, at least the portion of the virtual content is not viewable by the one or more unauthorized users based on the boundary virtual content associated with the boundary information.

In some aspects, a real world volume defined within the boundary virtual content is not viewable by the one or more unauthorized users based on the boundary virtual content associated with the boundary information.

In some aspects, one or more of the methods, apparatuses, and computer-readable medium described above further comprise outputting boundary virtual content identifying the boundary for the virtual private space, the boundary virtual content being viewable by the one or more unauthorized users of the virtual session.

In some aspects, the boundary information includes at least one of world coordinates in the physical space and one or more feature points in at least one image of the physical space usable to generate the boundary virtual content identifying the boundary for the virtual private space.

In some aspects, one or more of the methods, apparatuses, and computer-readable medium described above further comprise: receiving an indication that an unauthorized user has entered the virtual private space; and based on the indication that the unauthorized user has entered the virtual private space, occluding at least a portion of the unauthorized user from being viewable in the virtual private space by the one or more authorized users.

In some aspects, one or more of the methods, apparatuses, and computer-readable medium described above further comprise: receiving an indication that an unauthorized user has entered or is within a threshold distance of entering the virtual private space; and based on the indication that the unauthorized user has entered or is within the threshold distance of entering the virtual private space, moving one or more virtual objects in the virtual private space to avoid at least a portion of the unauthorized user.

In some aspects, one or more of the methods, apparatuses, and computer-readable medium described above further comprise: receiving an indication that an unauthorized user has entered or is within a threshold distance of entering the virtual private space; and based on the indication that the unauthorized user has entered or is within the threshold distance of entering the virtual private space, outputting a notification indicating a presence of the virtual private space.

In some aspects, outputting the notification includes at least one of sending the notification to a device of the unauthorized user and outputting an audio notification indicating the presence of the virtual private space. In some cases, the notification includes an outline of the unauthorized user.

In some aspects, one or more of the methods, apparatuses, and computer-readable medium described above further comprise: receiving an indication that an unauthorized user has entered or is within a threshold distance of entering the virtual private space; and based on the indication that the unauthorized user has entered or is within the threshold distance of entering the virtual private space, outputting a notification to one or more devices of the one or more authorized users indicating that the unauthorized user has entered or is within the threshold distance of entering the virtual private space. In some cases, the notification includes an outline of the unauthorized user.

In some aspects, the device or one or more of apparatuses is an extended reality device, and one or more of the methods, apparatuses, and computer-readable medium described above further comprise displaying, by the extended reality device, at least the portion of the virtual content.

In some aspects, the device or one or more of apparatuses is a first extended reality device, and one or more of the methods, apparatuses, and computer-readable medium described above further comprise outputting at least the portion of the virtual content to a second extended reality device.

In some aspects, the device or one or more of apparatuses is a first extended reality device, and one or more of the methods, apparatuses, and computer-readable medium described above further comprise displaying, by the first extended reality device, at least the portion of the virtual content; and outputting at least the portion of the virtual content to a second extended reality device.

In some aspects, the device or one or more of apparatuses is a first extended reality device, and one or more of the methods, apparatuses, and computer-readable medium described above further comprise: displaying, by the first extended reality device, at least the portion of the virtual content; outputting at least the portion of the virtual content to a second extended reality device; receiving, by the second extended reality device, the boundary information; and generating, by the second extended reality device, the virtual boundary content from the received boundary information.

In some aspects, the device or one or more of apparatuses is a server device, and one or more of the methods, apparatuses, and computer-readable medium described above further comprise outputting, by the server device, at least the portion of the virtual content to an extended reality device.

In some aspects, the apparatus comprises a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 4 is a diagram illustrating an example of an augmented reality virtual session with virtual content being displayed in a virtual private space, in accordance with some examples of the present disclosure;

FIG. 8 is a flow diagram illustrating an example of a process for generating virtual content for one or more virtual private spaces, in accordance with some examples of the present disclosure.

DETAILED DESCRIPTION

Figure 1:
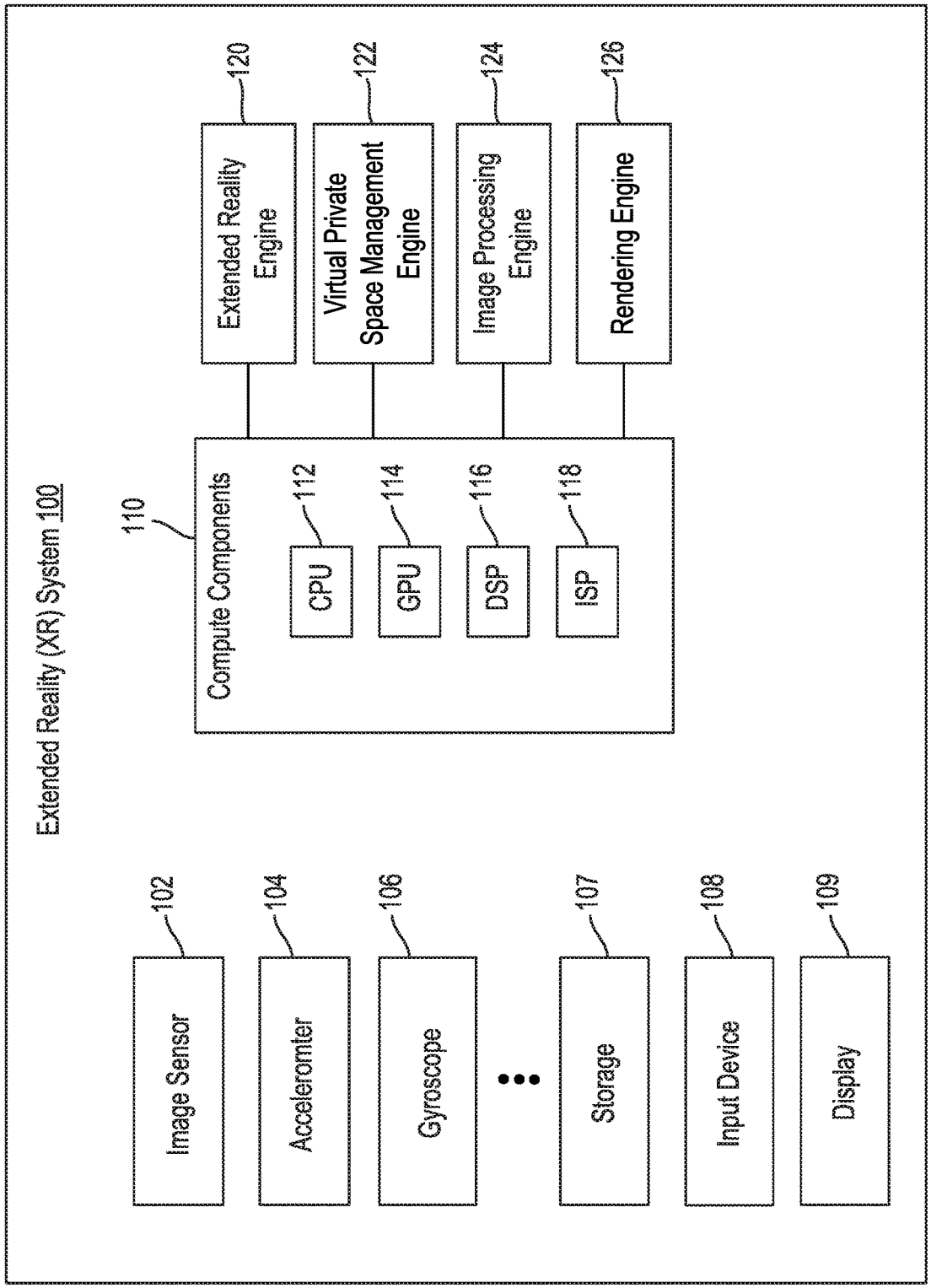
FIG. 1 is a block diagram illustrating an example extended reality system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Extended reality (XR) systems can facilitate interaction with different types of XR environments, including virtual reality (VR) environments, augmented reality (AR) environments, mixed reality (MR) environments, and/or other XR environments. An XR device can be used by a user to interact with an XR environment. Examples of XR devices include head-mounted displays (HMDs), smart glasses, among others. For example, an AR system can cause virtual content to be overlaid onto images of a real world environment, which can be viewed by a user through an AR device (e.g., an HMD, AR glasses, or other AR device). The real world environment can include physical objects, people, or other real world objects. The XR device can track parts of the user (e.g., a hand and/or fingertips of a user) to allow the user to interact with items of virtual content.

Real world objects can be complemented with virtual content that is present in an XR environment. For instance, a virtual coffee cup can be virtually anchored to (e.g., placed on top of) a real-world table in one or more images displayed during an AR session including an AR environment. People can also directly affect the virtual content and/or other real-world objects within the environment. For instance, a person in the space occupied by one or more items of virtual content can interact with one or more items of virtual content and/or with one or more real-world objects in various ways. In one example, a person can disrupt an AR session by moving and/or blocking (or occluding) virtual content being displayed. In another example, a person can move a real world object that is virtually supporting an item of virtual content (e.g., by moving a physical table holding a virtual coffee cup).

In some cases, a person may not be aware that an item of virtual content is being rendered in a given environment during an AR session. For example, a person may not be using (e.g., wearing) an AR device that allows the person to see virtual content of the AR session. In another example, a person may have an AR device, but may not be authorized to view the virtual content of the AR session. If a person in the space is not using an AR device or is not authorized to view certain virtual content, the person will not be able to see the virtual content and may inadvertently interfere with the virtual content in a manner that adversely impacts the user experience for users who are wearing AR devices and who are authorized to view and interact with the virtual content of the AR session.

Such interference can be problematic in some cases. For instance, an unexpected change in the virtual environment can be frustrating for users involved in a virtual session (e.g., an AR session or other XR session). As noted above, AR content can be anchored to one or more real-world objects that are observable and that can be manipulated by users that are not using AR devices. In one illustrative example, a multi-player AR gaming session may be initiated on a restaurant table containing plates, cups, cutlery, and other items. It can be frustrating for users observing AR content of an AR session when real-world objects used for anchors are moved and/or these objects otherwise frustrate immersion (e.g., if a cup is refilled by a server in a way that occludes/disrupts virtual content and/or affects anchoring).

It can also be desirable to maintain privacy of a virtual session such that others cannot view the virtual content shown to a user or users involved in the virtual session. However, users not authorized to view the virtual content of the virtual session may not realize that a virtual session is taking place or the extent of the session even if they are also using an AR device, and may inadvertently view the virtual content.

The present disclosure describes systems, apparatuses, methods, and computer-readable media for generating virtual private spaces. The techniques described herein provide the ability for a user of an XR device or system (e.g., HMD, AR glasses, etc.) to define a virtual private space for a virtual session (e.g., an AR session), where virtual content presented in the virtual private space can be seen and interacted with only by "authorized" users that are authorized to view (using XR devices, such as AR glasses) virtual content of the virtual private space. Unauthorized users are unable to view the virtual content displayed in the virtual private space. As used herein, unauthorized users are users of devices that are not authorized to view virtual content of a virtual session being presented in a virtual private space. As described herein, users can be authorized and unauthorized using any suitable authorization technique. A virtual private space can be a large space (e.g., a construction zone) or a small space (e.g., a game board displayed over a real-world table). Larger spaces can be larger than an area sensed by an individual user device. In some cases, a map corresponding to a large space may need to be re-drawn based on input from a communications network.

The virtual private space creates a "safe zone" where authorized AR users can conduct activities (e.g., virtual gaming, virtual sporting activities, virtual presentations, etc.) and not inadvertently be disturbed by other people or objects in the physical environment where the virtual activities are taking place. Examples are described herein using AR sessions and AR devices for illustrative purposes. One of ordinary skill will appreciate that the techniques can be applied to other XR environments, such as VR and/or MR environments.

Data defining the virtual content to be included in a virtual private space can be provided to different AR devices of authorized users so that the AR devices can display the virtual content to be included in the virtual private space. In some examples, the virtual private space can be implemented by generating and displaying boundary virtual content that demarcates the virtual private space and/or blocks the view of unauthorized users that may be in the same real-world environment as the authorized users of the virtual private space. For example, an AR device and/or a server can provide boundary information (e.g., world coordinates, feature points in an image, and/or other boundary information) to one or more AR devices of unauthorized users and in some cases to one or more other AR devices of authorized users of the virtual session. The boundary information can be used by the one or more AR devices to generate and display boundary virtual content identifying a boundary for the virtual private space. In another example, the AR device and/or server can generate the boundary virtual content identifying the boundary for the virtual private space, and can provide the boundary virtual content to the one or more AR devices of the unauthorized users and in some cases to the one or more other AR devices of the authorized users of the virtual session. In some cases, the one or more AR devices of the unauthorized users and/or the authorized users can determine the boundary information (e.g., world coordinates, feature points in an image, and/or other information) and can use the information to generate the boundary virtual content. In some cases, an AR device of one or more authorized users and/or a server can share a real-world map with AR devices of unauthorized users so the unauthorized users' AR devices can display the boundary or other visual indication of the virtual private space. In some cases, the virtual content defining the virtual private space can be generated based on the extent of virtual content in the virtual session, based on user input, and/or inferred from an application status provided from a user's AR device.

The boundary virtual content allows the existence of the virtual private space to be observed by users that are not authorized to view virtual content (unauthorized users) within the virtual private space. For example, an AR device of an unauthorized user can display a virtual barrier delineating the virtual space. Display of the boundary virtual content prevents unauthorized users from viewing the virtual content in the virtual private space, while at the same time limiting unintended disruptions of a virtual session. In one illustrative example, by observing (e.g., using an AR device) the boundary virtual information of a virtual private space, a restaurant service person can refrain from interfering with real-world objects contained within the virtual private space.

Further details regarding generation of virtual private spaces are provided herein with respect to various figures. FIG. 1 is a diagram illustrating an example extended reality system 100, in accordance with some aspects of the disclosure. The extended reality system 100 can run (or execute) XR applications and implement XR operations. In some examples, the extended reality system 100 can perform tracking and localization, mapping of the physical world (e.g., a scene), and positioning and rendering of virtual content on a display 109 (e.g., a screen, visible plane/region, and/or other display) as part of an XR experience. For example, the extended reality system 100 can generate a map (e.g., a three-dimensional (3D) map) of a scene in the physical world, track a pose (e.g., location and position) of the extended reality system 100 relative to the scene (e.g., relative to the 3D map of the scene), position and/or anchor virtual content in a specific location(s) on the map of the scene, and render the virtual content on the display 109 such that the virtual content appears to be at a location in the scene corresponding to the specific location on the map of the scene where the virtual content is positioned and/or anchored. The display 109 can include a glass, a screen, a lens, a projector, and/or other display mechanism that allows a user to see the real-world environment and also allows XR content to be displayed thereon.

In this illustrative example, the extended reality system 100 includes one or more image sensors 102, an accelerometer 104, a gyroscope 106, storage 107, compute components 110, an XR engine 120, a virtual private space management engine 122, an image processing engine 124, and a rendering engine 126. It should be noted that the components 102-126 shown in FIG. 1 are non-limiting examples provided for illustrative and explanation purposes, and other examples can include more, less, or different components than those shown in FIG. 1. For example, in some cases, the extended reality system 100 can include one or more other sensors (e.g., one or more inertial measurement units (IMUs), radars, light detection and ranging (LIDAR) sensors, audio sensors, etc.), one or more display devices, one more other processing engines, one or more other hardware components, and/or one or more other software and/or hardware components that are not shown in FIG. 1. An example architecture and example hardware components that can be implemented by the extended reality system 100 are further described below with respect to FIG. 9.

Moreover, for simplicity and explanation purposes, the one or more image sensors 102 will be referenced herein as an image sensor 102 (e.g., in singular form). However, one of ordinary skill in the art will recognize that the extended reality system 100 can include a single image sensor or multiple image sensors. Also, references to any of the components (e.g., 102-126) of the extended reality system 100 in the singular or plural form should not be interpreted as limiting the number of such components implemented by the extended reality system 100 to one or more than one. For example, references to an accelerometer 104 in the singular form should not be interpreted as limiting the number of accelerometers implemented by the extended reality system 100 to one. One of ordinary skill in the art will recognize that, for any of the components 102-126 shown in FIG. 1, the extended reality system 100 can include only one of such component(s) or more than one of such component(s).

The extended reality system 100 includes or is in communication with (wired or wirelessly) an input device 108. The input device 108 can include any suitable input device, such as a touchscreen, a pen or other pointer device, a keyboard, a mouse a button or key, a microphone for receiving voice commands, a gesture input device for receiving gesture commands, any combination thereof, and/or other input device. In some cases, the image sensor 102 can capture images that can be processed for interpreting gesture commands.

The extended reality system 100 can be part of, or implemented by, a single computing device or multiple computing devices. In some examples, the extended reality system 100 can be part of an electronic device (or devices) such as an extended reality head-mounted display (HMD) device, extended reality glasses (e.g., augmented reality or AR glasses), a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an IoT (Internet-of-Things) device, and/or any other suitable electronic device(s).

In some implementations, the one or more image sensors 102, the accelerometer 104, the gyroscope 106, storage 107, compute components 110, XR engine 120, virtual private space management engine 122, image processing engine 124, and rendering engine 126 can be part of the same computing device. For example, in some cases, the one or more image sensors 102, the accelerometer 104, the gyroscope 106, storage 107, compute components 110, XR engine 120, virtual private space management engine 122, image processing engine 124, and rendering engine 126 can be integrated into an HMD, extended reality glasses, smartphone, laptop, tablet computer, gaming system, and/or any other computing device. However, in some implementations, the one or more image sensors 102, the accelerometer 104, the gyroscope 106, storage 107, compute components 110, XR engine 120, virtual private space management engine 122, image processing engine 124, and rendering engine 126 can be part of two or more separate computing devices. For example, in some cases, some of the components 102-126 can be part of, or implemented by, one computing device and the remaining components can be part of, or implemented by, one or more other computing devices.

The storage 107 can be any storage device(s) for storing data. Moreover, the storage 107 can store data from any of the components of the extended reality system 100. For example, the storage 107 can store data from the image sensor 102 (e.g., image or video data), data from the accelerometer 104 (e.g., measurements), data from the gyroscope 106 (e.g., measurements), data from the compute components 110 (e.g., processing parameters, preferences, virtual content, rendering content, scene maps, tracking and localization data, object detection data, privacy data, XR application data, face recognition data, occlusion data, etc.), data from the XR engine 120, data from the virtual private space management engine 122, data from the image processing engine 124, and/or data from the rendering engine 126 (e.g., output frames). In some examples, the storage 107 can include a buffer for storing frames for processing by the compute components 110.

The one or more compute components 110 can include a central processing unit (CPU) 112, a graphics processing unit (GPU) 114, a digital signal processor (DSP) 116, and/or an image signal processor (ISP) 118. The compute components 110 can perform various operations such as image enhancement, computer vision, graphics rendering, extended reality (e.g., tracking, localization, pose estimation, mapping, content anchoring, content rendering, etc.), image/video processing, sensor processing, recognition (e.g., text recognition, facial recognition, object recognition, feature recognition, tracking or pattern recognition, scene recognition, occlusion detection, etc.), machine learning, filtering, and any of the various operations described herein. In this example, the compute components 110 implement the XR engine 120, the virtual private space management engine 122, the image processing engine 124, and the rendering engine 126. In other examples, the compute components 110 can also implement one or more other processing engines.

The image sensor 102 can include any image and/or video sensors or capturing devices. In some examples, the image sensor 102 can be part of a multiple-camera assembly, such as a dual-camera assembly. The image sensor 102 can capture image and/or video content (e.g., raw image and/or video data), which can then be processed by the compute components 110, the XR engine 120, the virtual private space management engine 122, the image processing engine 124, and/or the rendering engine 126 as described herein.

In some examples, the image sensor 102 can capture image data and can generate frames based on the image data and/or can provide the image data or frames to the XR engine 120, the virtual private space management engine 122, the image processing engine 124, and/or the rendering engine 126 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some cases, the image sensor 102 (and/or other camera of the extended reality system 100) can be configured to also capture depth information. For example, in some implementations, the image sensor 102 (and/or other camera) can include an RGB-depth (RGB-D) camera. In some cases, the extended reality system 100 can include one or more depth sensors (not shown) that are separate from the image sensor 102 (and/or other camera) and that can capture depth information. For instance, such a depth sensor can obtain depth information independently from the image sensor 102. In some examples, a depth sensor can be physically installed in the same general location as the image sensor 102, but may operate at a different frequency or frame rate from the image sensor 102. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The extended reality system 100 also includes one or more sensors. The one or more sensors can include one or more accelerometers (e.g., accelerometer 104), one or more gyroscopes (e.g., gyroscope 106), and/or other sensors. The one or more sensors can provide velocity, orientation, and/or other position-related information to the compute components 110. For example, the accelerometer 104 can detect acceleration by the extended reality system 100 and can generate acceleration measurements based on the detected acceleration. In some cases, the accelerometer 104 can provide one or more translational vectors (e.g., up/down, left/right, forward/back) that can be used for determining a position or pose of the extended reality system 100. The gyroscope 106 can detect and measure the orientation and angular velocity of the extended reality system 100. For example, the gyroscope 106 can be used to measure the pitch, roll, and yaw of the extended reality system 100. In some cases, the gyroscope 106 can provide one or more rotational vectors (e.g., pitch, yaw, roll). In some examples, the image sensor 102 and/or the XR engine 120 can use measurements obtained by the accelerometer 104 (e.g., one or more translational vectors) and/or the gyroscope 106 (e.g., one or more rotational vectors) to calculate the pose of the extended reality system 100. As previously noted, in other examples, the extended reality system 100 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

In some cases, the one or more sensors can include at least one IMU. An IMU is an electronic device that measures the specific force, angular rate, and/or the orientation of the extended reality system 100, using a combination of one or more accelerometers, one or more gyroscopes, and/or one or more magnetometers. In some examples, the one or more sensors can output measured information associated with the capture of an image captured by the image sensor 102 (and/or other camera of the extended reality system 100) and/or depth information obtained using one or more depth sensors of the extended reality system 100.

The output of one or more sensors (e.g., the accelerometer 104, the gyroscope 106, one or more IMUs, and/or other sensors) can be used by the extended reality engine 120 to determine a pose of the extended reality system 100 (also referred to as the head pose) and/or the pose of the image sensor 102 (or other camera of the extended reality system 100). In some cases, the pose of the extended reality system 100 and the pose of the image sensor 102 (or other camera) can be the same. The pose of image sensor 102 refers to the position and orientation of the image sensor 102 relative to a frame of reference (e.g., with respect to the object 202). In some implementations, the camera pose can be determined for 6-Degrees Of Freedom (6DOF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference).

In some cases, a device tracker (not shown) can use the measurements from the one or more sensors and image data from the image sensor 102 to track a pose (e.g., a 6DOF pose) of the extended reality system 100. For example, the device tracker can fuse visual data (e.g., using a visual tracking solution) from the image data with inertial data from the measurements to determine a position and motion of the extended reality system 100 relative to the physical world (e.g., the scene) and a map of the physical world. As described below, in some examples, when tracking the pose of the extended reality system 100, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the extended reality system 100 within the scene and the 3D map of the scene, etc. The 3D map can provide a digital representation of a scene in the real/ physical world. In some examples, the 3D map can anchor location-based objects and/or content to real-world coordinates and/or objects. The extended reality system 100 can use a mapped scene (e.g., a scene in the physical world represented by, and/or associated with, a 3D map) to merge the physical and virtual worlds and/or merge virtual content or objects with the physical environment.

In some aspects, the pose of image sensor 102 and/or the extended reality system 100 as a whole can be determined and/or tracked by the compute components 110 using a visual tracking solution based on images captured by the image sensor 102 (and/or other camera of the extended reality system 100). For instance, in some examples, the compute components 110 can perform tracking using computer vision-based tracking, model-based tracking, and/or simultaneous localization and mapping (SLAM) techniques. For instance, the compute components 110 can perform SLAM or can be in communication (wired or wireless) with a SLAM engine (not shown). SLAM refers to a class of techniques where a map of an environment (e.g., a map of an environment being modeled by extended reality system 100) is created while simultaneously tracking the pose of a camera (e.g., image sensor 102) and/or the extended reality system 100 relative to that map. The map can be referred to as a SLAM map, and can be three-dimensional (3D). The SLAM techniques can be performed using color or grayscale image data captured by the image sensor 102 (and/or other camera of the extended reality system 100), and can be used to generate estimates of 6DOF pose measurements of the image sensor 102 and/or the extended reality system 100. Such a SLAM technique configured to perform 6DOF tracking can be referred to as 6DOF SLAM. In some cases, the output of the one or more sensors (e.g., the accelerometer 104, the gyroscope 106, one or more IMUs, and/or other sensors) can be used to estimate, correct, and/or otherwise adjust the estimated pose.

In some cases, the 6DOF SLAM (e.g., 6DOF tracking) can associate features observed from certain input images from the image sensor 102 (and/or other camera) to the SLAM map. For example, 6DOF SLAM can use feature point associations from an input image to determine the pose (position and orientation) of the image sensor 102 and/or extended reality system 100 for the input image. 6DOF mapping can also be performed to update the SLAM map. In some cases, the SLAM map maintained using the 6DOF SLAM can contain 3D feature points triangulated from two or more images. For example, key frames can be selected from input images or a video stream to represent an observed scene. For every key frame, a respective 6DOF camera pose associated with the image can be determined. The pose of the image sensor 102 and/or the extended reality system 100 can be determined by projecting features from the 3D SLAM map into an image or video frame and updating the camera pose from verified 2D-3D correspondences.

In one illustrative example, the compute components 110 can extract feature points from every input image or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Speed Up Robust Features (SURF), Gradient Location-Orientation histogram (GLOH), Normalized Cross Correlation (NCC), or other suitable technique.

In some cases, the extended reality system 100 can also track the hand and/or fingers of the user to allow the user to interact with and/or control virtual content in a virtual environment (e.g., virtual content displayed in a virtual private space). For example, the extended reality system 100 can track a pose and/or movement of the hand and/or fingertips of the user to identify or translate user interactions with the virtual environment. The user interactions can include, for example and without limitation, moving an item of virtual content, resizing the item of virtual content and/or a location of the virtual private space, selecting an input interface element in a virtual user interface (e.g., a virtual representation of a mobile phone, a virtual keyboard, and/or other virtual interface), providing an input through a virtual user interface, etc.

Figure 2:
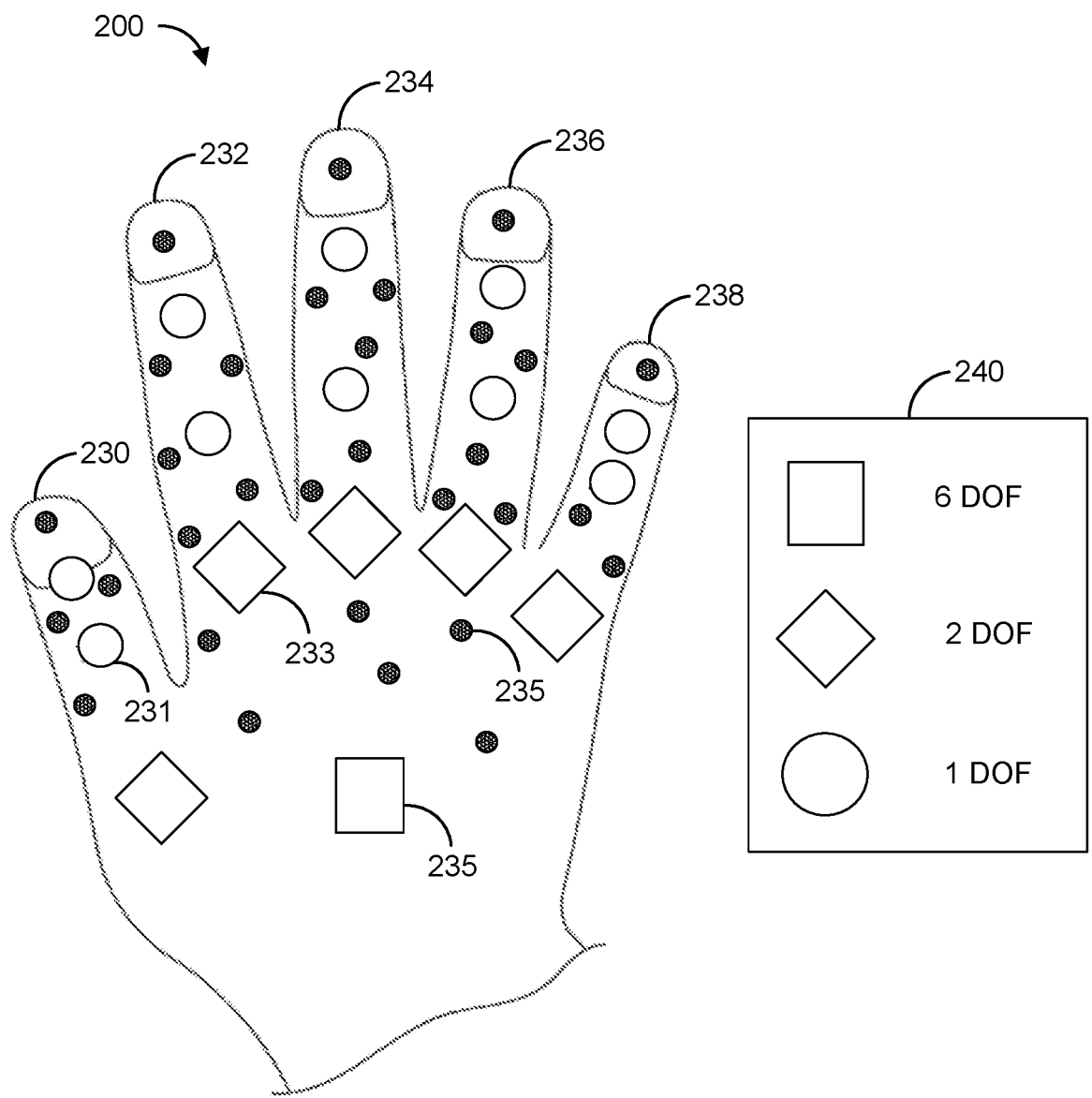
FIG. 2 is a diagram illustrating example landmark points of a hand that can be used to track positions of the hand and interactions by the hand with a virtual environment, in accordance with some examples of the present disclosure.

FIG. 2 is a diagram illustrating example landmark points of a hand 200 that can be used to track positions of the hand 200 and interactions by the hand 200 with a virtual environment, such as a virtual content displayed within a virtual private space as described herein. The landmark points shown in FIG. 2 correspond to different parts of the hand 200, including a landmark point 235 on the palm of the hand 200, landmark points on the thumb 230 of the hand 200, landmark points on the index finger 232 of the hand 200, landmark points on the middle finger 234 of the hand 200, landmark points on the ring finger 236 of the hand 200, and landmark points on the pinky finger 238 of the hand 200. The palm of the hand 200 can move in three translational directions (e.g., measured in X, Y, and Z directions relative to a plane, such as an image plane) and in three rotational directions (e.g., measured in yaw, pitch, and roll relative to the plane), and thus provides six degrees of freedom (6DOF) that can be used for registration and/or tracking. The 6DOF movement of the palm is illustrated as a square in FIG. 2, as indicated in the legend 240.

The different joints of the fingers of the hand 200 allow for different degrees of movement, as illustrated in the legend 240. As illustrated by the diamond shapes (e.g., diamond 233) in FIG. 2, the base of each finger (corresponding to the metacarpophalangeal joint (MCP) between the proximal phalanx and the metacarpal) has two degrees of freedom (2DOF) corresponding to flexion and extension as well as abduction and adduction. As illustrated by the circle shapes (e.g., circle 231) in FIG. 2, each of the upper joints of each finger (corresponding to the interphalangeal joints between the distal, middle, and proximal phalanges) has one degree of freedom (2DOF) corresponding flexion and extension. As a result, the hand 200 provides 26 degrees of freedom (26DOF) from which to track the hand 200 and interactions by the hand 200 with virtual content rendered by the extended reality system 100.

The extended reality system 100 can use one or more of the landmark points on the hand 200 to track the hand 200 (e.g., track a pose and/or movement of the hand 200) and track interactions with a virtual environment rendered by the extended reality system 100. As noted above, as a result of the detection of the one or more landmark points on the hand 200, the pose of the landmarks (and thus the hand and fingers) in relative physical position with respect to the extended reality system 100 can be established. For example, the landmark points on the palms of the hand 200 (e.g., the landmark point 235) can be detected in an image, and the locations of the landmark points can be determined with respect to the image sensor 102 of the extended reality system 100. A point of an item of virtual content (e.g., a center point, such as a center of mass or other center point) rendered by the extended reality system 100 can be translated to a position on a display (or a rendering on the display) of the extended reality system 100 (e.g., the display 109 of FIG. 1) relative to the locations determined for the landmark points on the palms of the hand 200.

As described below, the extended reality system 100 can also register the virtual content and/or the hand 200 to points in the real world (as detected in one or more images) and/or to other parts of the user. For instance, in some implementations, in addition to determining a physical pose of the hand 200 with respect to the extended reality system 100 (or extended reality system 100) and/or an item of virtual content, the extended reality system 100 can determine the location of other landmarks, such as distinctive points (referred to as feature points) on walls, one or more corners of objects, features on a floor, points on a human face, points on nearby devices, among others. In some cases, the extended reality system 100 can place the virtual content within a certain position with respect to feature points detected in the environment, which can correspond to, for example, detected objects and/or humans in the environment.

In some examples, the pose of the extended reality system 100 (and/or the head of the user) can be determined using, for example, image data from the image sensor 102 and/or measurements from one or more sensors such as the accelerometer 104, the gyroscope 106, and/or one or more other sensors (e.g., one or more magnetometers, one or more inertial measurement units (IMUs), etc.). The head pose can be used to determine a position of the virtual content, the hand 200, and/or objects and/or humans in the environment.

The operations for the XR engine 120, the virtual private space management engine 122, the image processing engine 124, and the rendering engine 126 (and any image processing engines) can be implemented by any of the compute components 110. In one illustrative example, the operations of the rendering engine 126 can be implemented by the GPU 114, and the operations of the XR engine 120, the virtual private space management engine 122, and the image processing engine 124 can be implemented by the CPU 112, the DSP 116, and/or the ISP 118. In some cases, the compute components 110 can include other electronic circuits or hardware, computer software, firmware, or any combination thereof, to perform any of the various operations described herein.

In some examples, the XR engine 120 can perform XR operations to generate an XR experience based on data from the image sensor 102, the accelerometer 104, the gyroscope 106, and/or one or more sensors on the extended reality system 100, such as one or more IMUs, radars, etc. In some examples, the XR engine 120 can perform tracking, localization, pose estimation, mapping, content anchoring operations and/or any other XR operations/functionalities. An XR experience can include use of the extended reality system 100 to present XR content (e.g., virtual reality content, augmented reality content, mixed reality content, etc.) to a user during a virtual session. In some examples, the XR content and experience can be provided by the extended reality system 100 through an XR application (e.g., executed or implemented by the XR engine 120) that provides a specific XR experience such as, for example, an XR gaming experience, an XR classroom experience, an XR shopping experience, an XR entertainment experience, an XR activity (e.g., an operation, a troubleshooting activity, etc.), among others. During the XR experience, the user can view and/or interact with virtual content using the extended reality system 100. In some cases, the user can view and/or interact with the virtual content while also being able to view and/or interact with the physical environment around the user, allowing the user to have an immersive experience between the physical environment and virtual content mixed or integrated with the physical environment.

The virtual private space management engine 122 can perform various operations to determine (and manage) how, where, and/or when to render virtual private spaces during an XR experience. A virtual private space can be defined for a virtual session (e.g., an AR session) by a user of the extended reality system 100 or automatically (e.g., based on user preferences, based on AR session requirements, etc.). A virtual private space can be generated for displaying virtual content over any region of a physical space. Virtual private spaces can be generated for large spaces (e.g., a construction zone, a concert hall, a sports venue, among others) or for a small space (e.g., a virtual conference call with virtual content displayed on a real-world conference table, a game board displayed over a real-world table, among others). A larger virtual space can be larger than an area sensed by an individual user device. For instance, as described below, crowdsourcing can be used to obtain the features of a large space, which can be used to generate a large virtual space. In some cases, a 3D map (e.g., SLAM map) corresponding to a large space may need to be re-drawn based on input obtained over a communications network. For example, a local map can be refined based on crowd sourced information of the same geographic coordinates.

A virtual private space can be delineated by boundary information defining a boundary of the virtual private space. The extended reality system 100 (e.g., the virtual private space management engine 122 and/or other component) can generate the boundary information or can obtain the boundary information from a server and/or other extended reality system. The boundary information is the data structure representing the boundary of the virtual private space. The virtual content defining the boundary of the virtual private space is referred to as boundary virtual content. The boundary virtual content identifies the boundary for the virtual private space. In some cases, the boundary information can include one or more feature points in at least one image of the physical space (e.g., captured by the image sensor 102) and/or can include world coordinates in the physical space. In some cases, the extended reality system 100 can receive the boundary virtual content from a server and/or from another XR system. In some cases, the extended reality system 100 can receive the feature points and/or the world coordinates from a server and/or from another XR system. In one illustrative example, the extended reality system 100 can receive the boundary virtual content (and other virtual content for the virtual session) and the feature points and/or world coordinates from a server. In another illustrative example, the extended reality system 100 can receive the boundary virtual content (and/or other virtual content for the virtual session) from a server, and can receive feature points and/or world coordinates from another XR system. The extended reality system 100 can use the feature points and/or the world coordinates to generate the boundary virtual content (e.g., to determine where to display the boundary virtual content with respect to items in the physical space). Further details regarding the use of feature points and/or world coordinates are described below.

In some examples, boundary virtual content can be generated based on a user's gaze and/or in response to a non-user's gaze towards the virtual content of the virtual session displayed within the virtual private space. For example, if an XR system of an authorized user detects an unauthorized users is gazing toward the virtual private space, the boundary virtual content can be generated to block the view of the unauthorized users from viewing the virtual content of the virtual private space.

Based on the boundary virtual content, the virtual content of the virtual session displayed within the virtual private space can be seen and interacted with only by authorized users that are authorized to view (using XR devices, such as HMDs, AR glasses, etc.) virtual content of the virtual session. The boundary virtual content blocks the virtual content in the virtual private space from being viewed by unauthorized users that may be in the same real-world environment as the authorized users, such that the unauthorized users are unable to view the virtual content. The boundary virtual content also provides an indication of the existence of the virtual private space to unauthorized users that are located in the physical space in which the virtual content is displayed. For an unauthorized user that is using an XR device or system, the XR device can display the boundary virtual content (e.g., as a virtual barrier) delineating the virtual space.

For an unauthorized user that is not using an XR device or system, the unauthorized users can be alerted as to a location (e.g., the boundary) of the virtual private space. For instance, when an unauthorized user does not have an XR device that allows the user to view virtual content, a notification can be sent to a device (e.g., a mobile device, a wearable device such as a smartwatch or other wearable, or other device) of the unauthorized user to indicate the presence and/or location of the virtual private space. In one example, the extended reality system (of an authorized user) and/or a server implementing the virtual session can send a notification (e.g., a text-based message, an audible message, and/or other notification) indicating where the virtual private space is located to a mobile device, a wearable device, and/or other device of an unauthorized user. In another example, the extended reality system can provide a notification (e.g., a visual notification, an audible notification, and/or other notification) in response to the extended reality system detecting an unauthorized user without an XR device (e.g., a user that is not using an XR device) is close to or within certain distance (e.g., 10 feet, 5 feet, 2 feet, and/or other distance) to the virtual private space. The notification can allow the unauthorized user to be aware of the location of the virtual private space, thus avoiding interfering with the AR session being conducted in the virtual private space. In such cases, interoperability can be provided between devices and networks. For example, protocols can be defined to keep the virtual space private and to provide the ability for user devices to openly share XR capabilities and/or content to and from the user devices (e.g., for devices from different vendors/implementations).

The virtual private space thus creates a region of a physical space where authorized users can privately conduct activities (e.g., virtual gaming, virtual sporting activities, virtual presentations, etc.) and not inadvertently be disturbed by other people or objects in the physical environment where the virtual activities are taking place. Display of the boundary virtual content prevents unauthorized users from viewing the virtual content in the virtual private space, while at the same time limiting unintended disruptions of a virtual session.

Users of XR devices or systems can be authorized to participate in a virtual session associated with a virtual private space using any suitable authorization technique. In some examples, users of XR devices can be authorized and unauthorized using electronic signatures in the respective XR devices. In one illustrative example, the hardware of the AR device can be recognized and validated (resulting in a user being authorized) or invalidated (resulting in a user not being authorized). In another example, authorized users can be provided with login credentials that are used to authorize the users. For instance, multiple users can be authorized to participate in a virtual poker game by entering login credentials into a graphical interface of an application that facilitates the virtual poker game. Users without the login credentials are unable to join the virtual session. In some examples, users of XR devices can be authorized and unauthorized using other authorization techniques, such as based on hand gesture(s), eye gaze, face recognition, voice command(s), and/or other authorization techniques.

As noted above, the boundary information can additionally or alternatively include world coordinates in the physical space and/or one or more feature points in at least one image of the physical space (e.g., captured by the image sensor 102). In such cases, the boundary information (the world coordinates and/or feature point(s)) can be used by the extended reality system 100 to generate the boundary virtual content identifying the boundary for the virtual private space. Examples of using feature points and map data (e.g., using simultaneous localization and mapping (SLAM) techniques) are described above. For instance, the world coordinates can indicate the location in the map (e.g., a 3D map such as a SLAM map) of the real-world environment of a surface on which virtual content will be displayed (and thus where the virtual private space will be located). Images of the surface can be obtained (e.g., captured by the image sensor 102), and feature points of the surface can be extracted. The feature points can include points of distinctive features of the surface, such as lines, corners, distinctive shapes, among other features.

Items of virtual content can be registered or anchored to (e.g., positioned relative to) the detected feature points in a scene. For example, the virtual private space management engine 122 can coordinate with the XR engine 120 and/or the rendering engine 126 to anchor the virtual content of the virtual private space and the boundary virtual content to the feature points of the surface on which the virtual content will be displayed. In one illustrative example, a user can be looking at a table in a public space which the user wants to use for a multi-user AR session (e.g., to play a card game). The user can provide input to the extended reality system 100 (e.g., using input device 108) indicating that the user wants to conduct an AR session on the table and that the AR session is to be associated with a virtual private space. The extended reality engine 120, the virtual private space management engine 122, the image processing engine 124, and/or rending engine 126 (implemented by the compute components 110) can obtain images of the table captured by the image sensor 102 and can identify features of the table from the images. The display 109 can display AR content associated with the AR session on the table by anchoring the AR content to certain feature points of the table. The virtual private space management engine 122 can generate or receive (e.g., from a server) boundary virtual content for indicating the boundaries of the virtual private space, and the boundary virtual content can be anchored to features of the table. For example, the extended reality engine 120 can register the AR content and the boundary virtual content to feature points on the table so that the AR content and boundary virtual content are displayed relative to the table.

In another example, the user can be facing a restaurant across the street from where the user is standing. In response to identifying the restaurant from one or more images and obtaining AR content associated with the restaurant, the extended reality engine 120 can generate an AR object that provides information related to the restaurant. Feature points can be detected from a portion of an image that includes a sign on the restaurant. The extended reality engine 120 can register the AR object to the feature points of the sign so that the AR object is displayed relative to the sign (e.g., above the sign so that it is easily identifiable by the user as relating to that restaurant).

In some implementations, authorized users can prevent other authorized users from viewing certain content in the virtual private zone. For instance, a particular application being executed by a user device can prevent devices of other users executing that application from displaying certain content. In one illustrative example, multiple users can be playing in a multi-player poker game, and the user devices can be prevented from displaying other users' cards.

In some examples, multiple virtual private spaces can be defined by the virtual private management engine 122 of the extended reality system 100 and/or by other XR systems. In some cases, a new virtual private space cannot be displayed over an existing virtual private space, which can prevent interference between virtual private spaces. For instance, virtual geo-fencing can be determined by selecting objects in a space or drawing a barrier around the private space. In some cases, each virtual private space can be defined with respect to one common reference point in the space. For instance, a virtual space is a volume in space with content displayed within it. In an XR device, this volume of space can be defined relative to a tracking reference frame (e.g., a 3D coordinate frame with an origin and axis directions). Multiple virtual private spaces can be defined relative to the same reference frame.

In some examples, individual authorized users of a virtual private space can invite one or more authorized users of other virtual private space(s) to merge the different private spaces. For example, if two virtual sessions are being conducted in separate virtual private spaces close to one another, the authorized users of the two virtual spaces can agree to combine the two virtual sessions into a single virtual private space.

In some cases, one or more authorized users of a private space (e.g., a user of the extended reality system 100 and other users of XR systems that are authorized for the private space) can be alerted when disturbances or changes occur in the virtual private space. For example, the moving, removing, adding, and/or altering of real world objects and/or unauthorized users being present in a virtual private space can trigger a notification of the event to the devices of the authorized users. In some examples, a visual indication can be displayed by the display 109 and/or an audible indication can be output through a speaker (not shown) of the extended reality system 100 to indicate to the user that a disturbance or change has occurred in the virtual private space. In one illustrative example, multiple users can be participating in a multi-user virtual conference, where the virtual content associated with the virtual conference is being displayed on a table in a private room of a restaurant. In one example, a restaurant service person may place a beverage on the table in front of each of the users. The extended reality system 100 can output a notification to the users (including the user of the extended reality system 100) that an item has been placed within the boundary of the virtual private space. In another example, the extended reality system 100 can output a notification to the users (including the user of the extended reality system 100) when a virtual item is newly displayed in the virtual private space. In another example, using one or more images from the image sensor 102 and/or measurements from the one or more sensors (e.g., the accelerometer 104, the gyroscope 106, one or more IMUs, and/or other sensors), the extended reality system 100 can determine when a person or object is within a certain distance (e.g., 10 feet, 5 feet, 2 feet, and/or other distance) from interfering with the virtual private space. The extended reality system 100 can output a notification to indicate to the user of the extended reality system 100 that the person may interfere with the virtual private space. In some cases, an alert can be triggered and provided to devices of authorized users based on detection of changes to the map of the virtual private space. In some cases, the notification can include details about the interfering person or object.

In some examples, the virtual content in the virtual private space can be displayed with higher priority than real-world content. For instance, the extended reality system 100 and/or a server in communication with the extended reality system 100 can de-emphasize real-world objects and/or parts of unauthorized users in the virtual private space. In some cases, any physical object that enters the private space can be fully or partially occluded. In some examples, when an object or part of a person is fully occluded, the extended reality system 100 and/or the server can provide (e.g., visually or audibly) an indication of location of the object or person to the authorized users. In one illustrative example, the extended reality system 100 can fully or partially occlude a part of an unauthorized user's body (e.g., an arm) if the body part enters the virtual private space. In another example, if a physical object (e.g., body part of a person, a cup, and/or other physical object) is placed in a position where an item of virtual content is being displayed in the virtual private space, the extended reality system 100 can display the item of virtual content over the physical object or can occlude the physical object so that it is not displayed by (or viewable through) the extended reality system 100. In cases when an object is occluded, devices of the authorized users participating in the virtual session associated with the virtual private space can be alerted as to the presence of the object. In some examples, if an unauthorized person and/or other object comes into contact with virtual content in the virtual space, the virtual content can be moved to avoid the unauthorized person and/or other object. In some examples, if a virtual object is dependent upon a real-world object (e.g., a virtual cup sitting on a real world table) and the real world object is removed from the physical space, then the extended reality system 100 can render a replica of the real-world object and maintain the dependency. In some cases, the extended reality system 100 can cause the virtual object to fall or move with the moved real-world object.

In some implementations, the extended reality system 100 can perform object detection and/or recognition (e.g., human detection and/or recognition) to verify authorized users and/or to identify when a physical user or object has entered into or is within a certain distance of a virtual private space. The object detection and/or recognition can be image based, voice based, and/or using other technique for detecting/recognizing objects. For instance, authorized users can be verified by performing body, face, and/or voice recognition. Verifying an authorized user prior to allowing the user to view and interact with virtual content in a virtual private space can prevent an unauthorized person from using an XR system of an authorized person and viewing and interacting with the private content.

In some cases, crowd sourcing can be used to provide enhanced details of the virtual private space to authorized users and/or unauthorized users. For example, image and sensor information from XR systems worn by multiple authorized users (and in some cases unauthorized users) can provide information that can be used to enhance the virtual private space. In some examples, computing devices of authorized users (and in some cases unauthorized users) other than XR systems (e.g., such as mobile devices, wearable devices, laptops, tablets, and/or other devices) can provide information used to enhance the virtual space. For instance, the crowd sourcing data from the authorized user devices and/or unauthorized user devices can be used by the extended reality system 100 (and/or by a server in communication with the extended reality system 100) to reliably map and track the virtual space with respect to the real world environment, which can allow the extended reality system 100 (and/or the server) to more accurately monitor the virtual private space. Improved monitoring of the virtual private space allows the extended reality system 100 and/or the server to better inform authorized users about disturbances or changes to the virtual private space.

In some implementations, all devices (of authorized users) authorized to participate in a virtual session being implemented in a virtual private space can share information about the virtual private space in order to provide each device with the most accurate and up-to-date information about the space. Such information can include intrusions by unauthorized users, the locations of virtual content in the virtual private space, changes to the physical environment, unseen angles and/or sides of the virtual content, among other information. Crowd-sourced sharing of information relating to unseen virtual content can help reduce latency and increase accuracy for rendering virtual objects in a virtual private space shared by multiple users. Such crowd-sourcing can be important in large virtual spaces that are larger than can be mapped using sensors of a single XR system.

As noted above, the crowd sourcing can be implemented using view (data) of the private space from unauthorized users. For example, because the boundary of a virtual private space is virtual (as defined by the boundary information and the associated boundary virtual content) and is not a rigid barrier between unauthorized users and the contents of the virtual private space, unauthorized devices (of unauthorized users) can share information about the virtual private space with authorized devices (of authorized users) in order to provide accurate and up-to-date information about the virtual private space beyond the data being shared among the devices of authorized users. In such examples, the unauthorized users would not be able to see the private virtual content in the virtual private space, but the data related to the space could be shared with the authorized users.

In some examples, authorized users can broadcast information (e.g., game scores, a food or drink order, a message, and/or other information) and/or virtual content (e.g. virtual items of a virtual game, an image of food or a drink being ordered, an image of a message, and/or other content) to unauthorized users. The amount of information provided to devices of unauthorized users can be controlled by the authorized user sending the information.

The image processing engine 124 can perform one or more image processing operations related to virtual content being presented in a virtual private space and/or related to other image content. For instance, the image processing engine 124 can perform image processing operations based on data from the image sensor 102. In some cases, the image processing engine 124 can perform image processing operations such as, for example, filtering, demosaicing, scaling, color correction, color conversion, segmentation, noise reduction filtering, spatial filtering, artifact correction, etc. The rendering engine 126 can obtain image data generated and/or processed by the compute components 110, the image sensor 102, the XR engine 120, the virtual private space management engine 122, and/or the image processing engine 124, and can render video and/or image frames for presentation on a display device.

While the extended reality system 100 is shown to include certain components, one of ordinary skill will appreciate that the extended reality system 100 can include more or fewer components than those shown in FIG. 1. For example, the extended reality system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing system and hardware components that can be implemented with the extended reality system 100 is described below with respect to FIG. 9.

Figure 3:
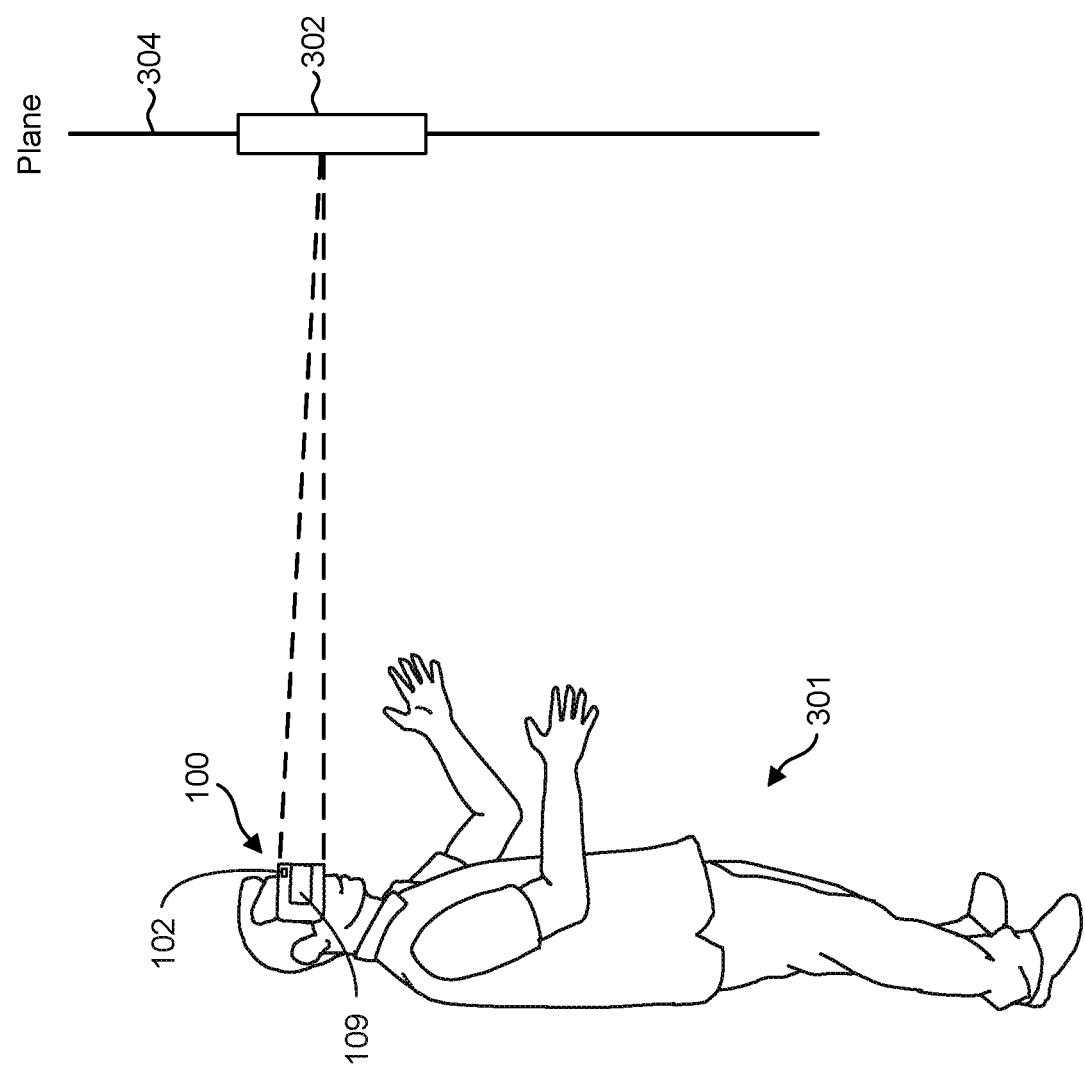
FIG. 3 is a diagram illustrating an example of an extended reality system being worn by a user, in accordance with some examples of the present disclosure.

FIG. 3 is a diagram illustrating an example of the extended reality system 100 being worn by a user 301. While the extended reality system 100 is shown in FIG. 3 as an AR device (e.g., AR glasses), the extended reality system 100 can include any suitable type of XR device, such as an HMD or other XR device. Examples described below will be described using AR for illustrative purposes. However, the aspects described below can be applied to other types of XR, such as VR and MR. The extended reality system 100 shown in FIG. 3 can include an optical see-through AR device, which allows the user 301 to view the real world while wearing the extended reality system 100. For example, the user 301 can view an object 302 in a real-world environment on a plane 304 at a distance from the user 301. As shown in FIG. 3 and described above, the extended reality system 100 has an image sensor 102 and a display 109. As described above, the display 109 can include a glass, a screen, a lens, and/or other display mechanism that allows the user 301 to see the real-world environment and also allows AR content to be displayed thereon. AR content (e.g., an image, a video, a graphic, a virtual or AR object, or other AR content) can be projected or otherwise displayed on the display 109. In one example, the AR content can include an augmented version of the object 302. In another example, the AR content can include additional AR content that is related to the object 302 and/or related to one or more other objects in the real-world environment. While one image sensor 102 and one display 109 are shown in FIG. 3, the extended reality system 100 can include multiple cameras and/or multiple displays (e.g., a display for the right eye and a display for the left eye) in some implementations.

As described above with respect to FIG. 1, a virtual private space can be generated for presenting AR content of a particular AR session. FIG. 4 is a diagram illustrating an example of an AR virtual session with virtual content 458 being displayed by the extended reality system 100 in a virtual private space 450. Boundary virtual content 451 is shown outlining the virtual private space 450. A group of authorized users is shown, with a first authorized user 452 being represented by a first virtual representation of hands, a second authorized user 454 being represented by a second virtual representation of hands, and a third authorized user 456 being represented by a third virtual representation of hands. The authorized user 456 is using the extended reality system 100, and each of the authorized users 452 and 454 are using respective XR devices. The authorized users 452, 454, 456 are authorized to view the virtual content 458 of the virtual session using their respective XR devices.

The authorized users 452, 454, 456 may be located at a restaurant and interested in participating in a virtual poker game using a location in the restaurant. In some cases, the authorized users 452, 454, 456 can be authorized by providing login credentials (e.g., manually entering a user name and password using an input mechanism, using a face authentication-based login, and/or other login technique) to a user interface of an application installed on the respective XR devices and associated with the virtual poker game. In cases, the XR devices of the authorized users 452, 454, 456 can be authorized using the hardwire signatures described above. Any other authorization or authentication technique can be used to authorize the authorized users 452, 454, 456.

The authorized users 452, 454, 456 can identify a table 459 at the restaurant as a surface on which to display the virtual content 458 for the virtual poker game. The authorized user 456 of the extended reality system 100 (and/or the other authorized users 452 and/or 454) can provide input to the extended reality system 100 indicating that the user wants a virtual private space generated for the virtual poker game on the table 459. In some cases, the input requesting a virtual private space can be provided using the user interface of the application associated with the virtual poker game.

In response to the input, the extended reality system 100 can generate or receive (e.g., from a server) data defining the virtual content of the virtual poker game and boundary information that can be used to generate the boundary virtual content 451 defining the bounds of the virtual private space 450. The data defining the virtual content (e.g., virtual content 458) to be included in the virtual private space 450 can be provided to the different XR devices of the authorized users 452, 454, 456 so that the XR devices can display the virtual content defining the virtual private space 450. For example, a server associated with the virtual poker game can provide the virtual content (and in some cases the boundary information) to the XR devices. In some cases, the server can provide the virtual content (and in some cases the boundary information) to the extended reality system 100 of the authorized user 456, and the extended reality system 100 can provide the virtual content (and in some cases the boundary information) to the XR devices of the other users 452 and 454.

In some cases, as noted above, the boundary information can include the boundary virtual content 451. In some cases, the boundary information can alternatively or additionally include coordinate information defining the location of the boundary virtual content 451 in a 3D map (e.g., a SLAM map) and feature points of the table 459 defining where the boundary virtual content 451 will be anchored or registered. The extended reality system 100 can provide the boundary information to XR devices of other users that are not authorized (unauthorized users) to view and/or interact with the virtual content 458. The XR devices of the other users can use the boundary information to generate and/or display the boundary virtual content 451. In some cases, the extended reality system 100 can display the boundary virtual content 451 around the virtual content 458 so that the authorized user 456 can view the boundary virtual content 451. In some cases, the XR devices of the authorized users 452, 454, 456 do not display the boundary virtual content 451 for viewing by the authorized users 452, 454, 456.

In some examples, as shown in FIG. 4, the boundary virtual content 451 can be a virtual boundary displayed around a portion of the top of the table on which the virtual content is displayed (e.g., as a three-dimensional box around the virtual content). In other examples, the boundary virtual content 451 can be a virtual boundary displayed around the entire table 459 being used as a backdrop for the virtual content. In some cases, an application associated with a particular virtual session can define how the boundary virtual content is displayed. For example, the virtual poker game illustrated in FIG. 4 can have a particular game board that is defined by the application used to facilitate the virtual poker game. The boundary virtual content 451 can be defined by the application so that it surrounds the game board of the virtual poker game. The boundary defined by the boundary virtual content 451 can be configured in any other manner.

The diagram of FIG. 4 is from the perspective of the content that the user 456 is viewing through the extended reality system 100. As shown, the user 456 can view the virtual content 458 of the virtual private space 450 and can also view the underlying physical table 459. In some examples, the extended reality system 100 can display the boundary virtual content 451 for viewing by the authorized user 456. In some examples, the extended reality system 100 does not display the boundary virtual content 451, for example to avoid the authorized user 456 from being distracted by the boundary virtual content 451. The other two authorized users 452 and 454 can also view the same virtual content 458 and table 459 through their respective XR devices, but from a different perspective or angle (corresponding to where each of the authorized users 452 and 454 is sitting at the table 459). As described with respect to FIG. 5 below, XR devices or systems of unauthorized users will not have access to and will not be able to display the virtual content 458. For example, any unauthorized user that is using an XR device would not be able to view the virtual content 458, instead only being able to view the boundary virtual content 451. Unauthorized users that are not using an XR device or system can be notified of the existence and/or location of the virtual private space 450.

Figure 5:
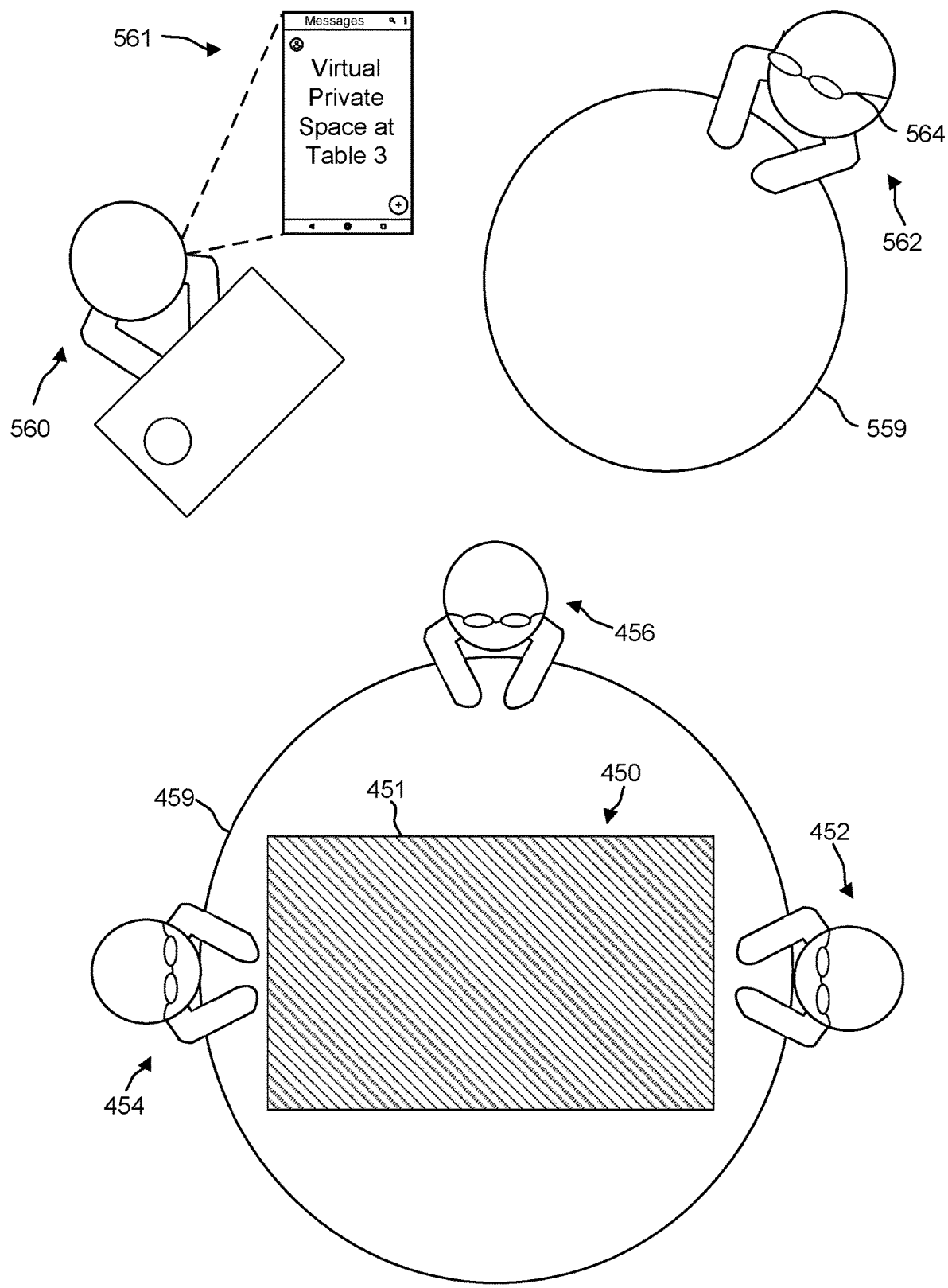
FIG. 5 is a diagram illustrating another view of the virtual private space shown in FIG. 4, in accordance with some examples of the present disclosure.

FIG. 5 is a diagram illustrating another view of the virtual private space 450 from FIG. 4. The diagram of FIG. 5 is from the perspective of unauthorized users and how such unauthorized users can view the virtual private space 450 when using an XR device. The actual (physical) authorized users 452, 454, and 456 are shown sitting around the table 459, each wearing the respective XR devices (shown as AR glasses for illustrative purposes). As noted above, the authorized users 452, 454, 456 are authorized to view the virtual content 458 of the virtual session as shown in FIG. 4 and in some cases the boundary virtual content 451 using their respective XR devices.

An unauthorized user 560 and an unauthorized user 562 are also shown in FIG. 5. As previously noted, XR devices of unauthorized users will not have access to and will not be able to display the virtual content 458. For example, any unauthorized user that is using an XR device would only be able to view the boundary virtual content 451. The unauthorized user 562 is a person sitting at a table 559, which is near the table 459 at which the authorized users 452, 454, and 456 are sitting. As shown, the unauthorized user 562 is wearing an XR system 564 (e.g., AR glasses) and may be viewing virtual content, but is not authorized to view the virtual content 458 shown in the virtual private space 450. Because the unauthorized user 562 is not authorized to view the virtual content 458, when the unauthorized user 562 turns such that a field of view of the XR system 564 is directed at the table 459, the XR system 564 will display the boundary virtual content 451. The boundary virtual content 451 blocks the unauthorized user 562 from viewing the virtual content 458 in the virtual private space 450.

Figure 6:
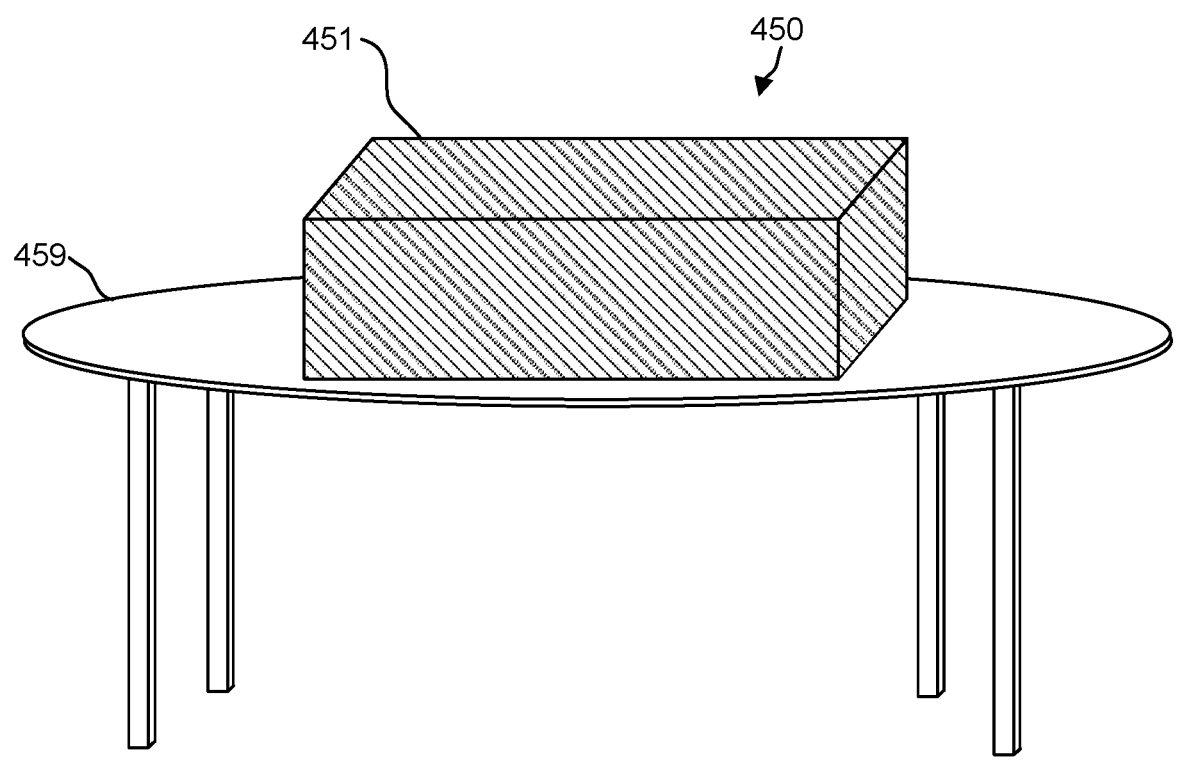
FIG. 6 is a diagram illustrating an example of a profile view of the table and the boundary virtual content from FIG. 4, in accordance with some examples of the present disclosure.

FIG. 6 is a diagram illustrating a profile view of the table 459 and the boundary virtual content 451. As shown in FIG. 6, the boundary virtual content 451 can be displayed to unauthorized users in three dimensions, which can allow the virtual content within the virtual private space 450 to remain private from all angles of view. The boundary virtual content 451 can be displayed differently to authorized users. For instance, the boundary virtual content 451 can be displayed to unauthorized users in three dimensions, and can either be displayed in a modified manner or not displayed at all to authorized users. In one example, the boundary virtual content 451 can be displayed as a dotted outline in two dimensions to authorized users, so as to not impair the view of the virtual content 458.

Unauthorized users that are not using an XR device can be notified of the existence and/or location of the virtual private space 450. The unauthorized user 560 shown in FIG. 5 is a service person employed by the restaurant. As shown, the unauthorized user 560 is bringing a tray of beverages to the table 459 for the authorized users 452, 454, 456. The unauthorized user 560 is not using an XR device, and thus cannot view the boundary virtual content 451. The unauthorized user 560 does have a mobile device 561. Any one or more of the XR devices of the authorized users 452, 454, 456 (including the extended reality system 100) can detect the presence of the mobile device 561 and can cause a notification to be sent to the mobile device 561 indicating the presence and/or location of the virtual private space 450. In some examples, the extended reality system 100 (or XR device of one of the users 452, 454) can send a message to the mobile device 561 with information indicating the existence and location of the virtual private space 450. In another example, a server providing the virtual content 458 to the XR devices of the authorized users 452, 454, 456 can send the message to the mobile device 561 of the unauthorized user 560. As shown in FIG. 5, the message can indicate that there is a "virtual private space at Table 3," referring to the table 459 at which the authorized users 452, 454, 456 are seated. Based on the notification or message, the unauthorized user 560 can be made aware that the virtual private space 450 is present at the table 459 and can avoid placing the beverages in the physical space occupied by the virtual private space 450.

In the event the unauthorized user 560 does place a beverage or other physical item within the virtual private space 450, one or more of the XR devices of the authorized users 452, 454, 456 can output a notification to the authorized users 452, 454, 456. For instance, the extended reality system 100 of the authorized user 456 can display a notification on the display 109 that alerts the authorized user 456 that a physical item has been placed in the virtual private space 450.

In some cases, one or more of the XR devices of the authorized users 452, 454, 456 can detect when the unauthorized user 560 is within a certain distance from the virtual private space 450. For instance, a threshold distance can be defined, such as 10 feet, 5 feet, 2 feet, and/or other distance. If the unauthorized user 560 moves within the threshold distance from the virtual private space 450, one or more of the XR devices of the authorized users 452, 454, 456 can output a notification to the authorized users 452, 454, 456. For instance, the extended reality system 100 of the authorized user 456 can display a notification on the display 109 that alerts the authorized user 456 that a person or object is approaching the virtual private space 450. In some examples, the threshold distance can be defined based on the physical environment in which the virtual private space is being implemented. For instance, in a restaurant environment, there can be many people moving throughout the physical environment. In such cases, the threshold distance can be made smaller to avoid numerous notifications being sent to the XR devices of the authorized users 452, 454, 456. In environments with less people or objects, the threshold distance can be made larger.

Figure 7A:
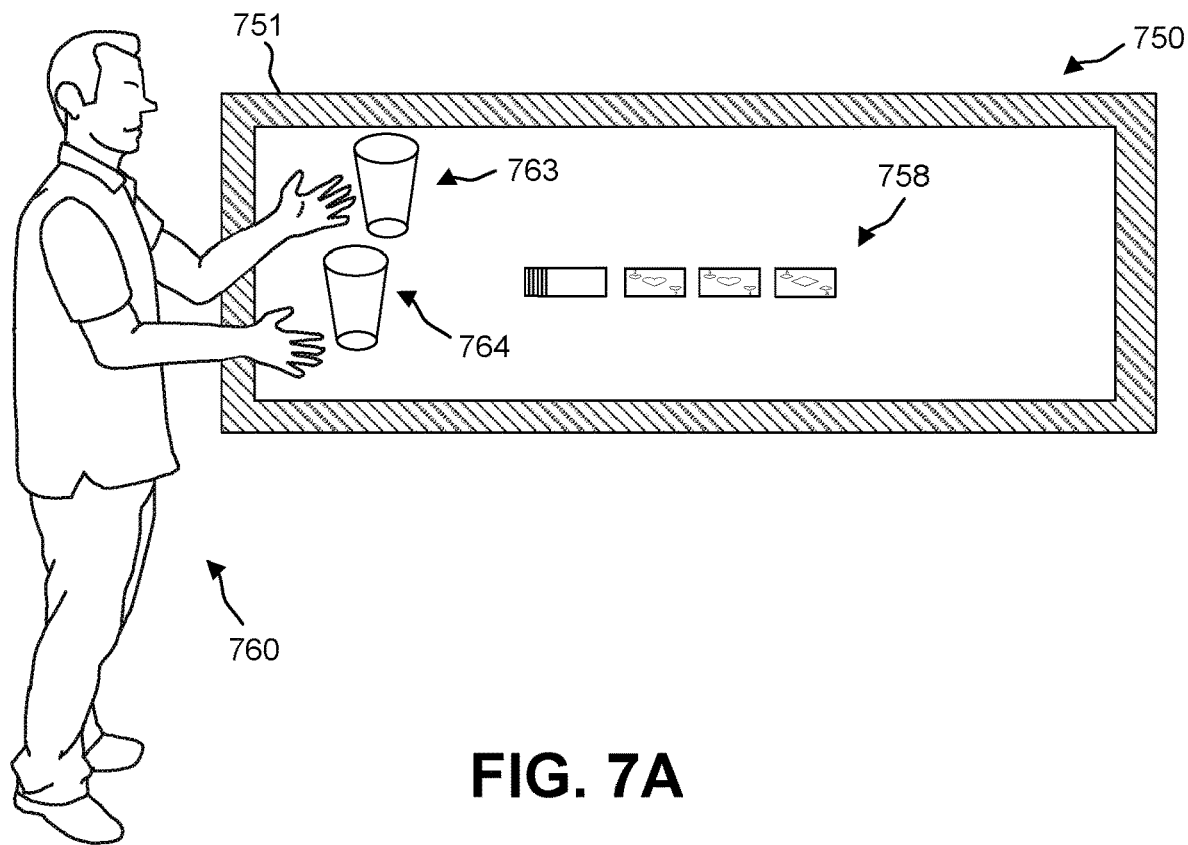
FIG. 7A, FIG. 7B, and FIG. 7C are diagrams illustrating an example of a person physically entering a virtual private space, in accordance with some examples of the present disclosure.
Figure 7B:
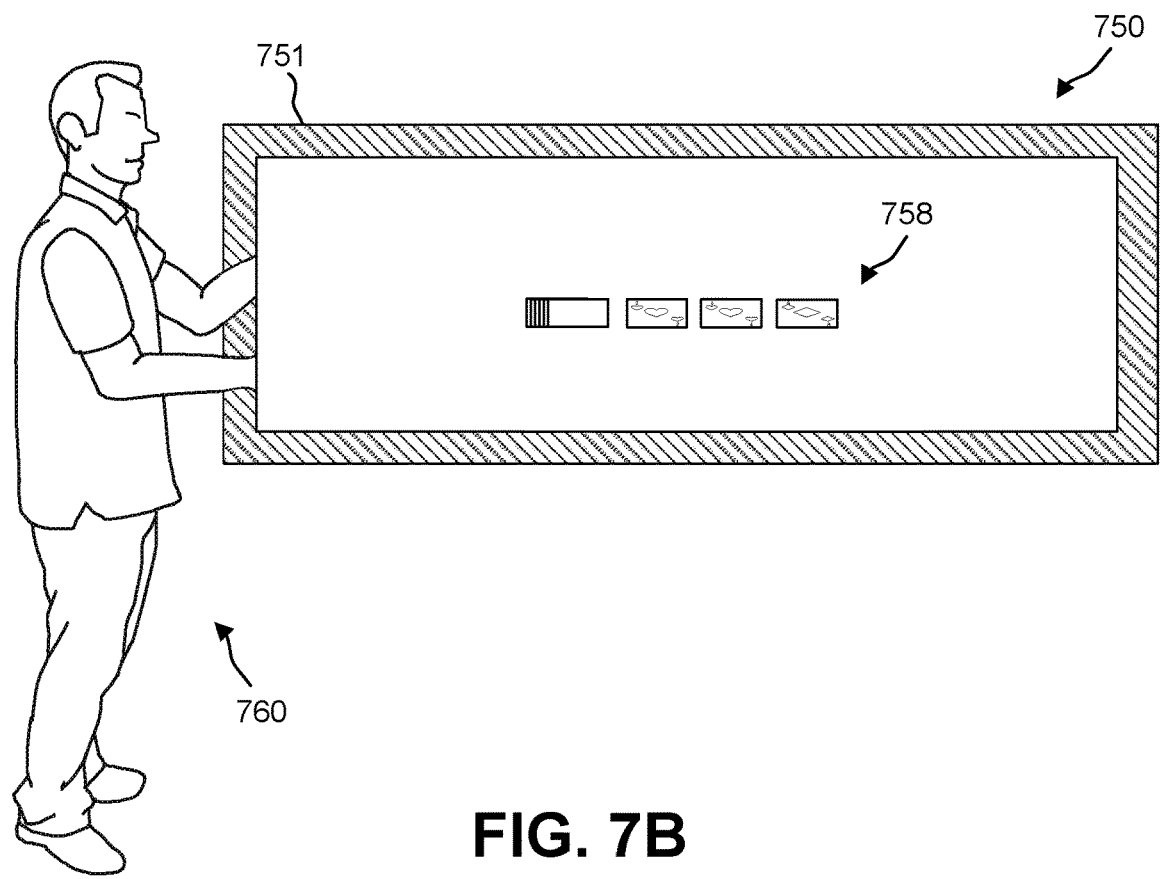
Figure 7C:
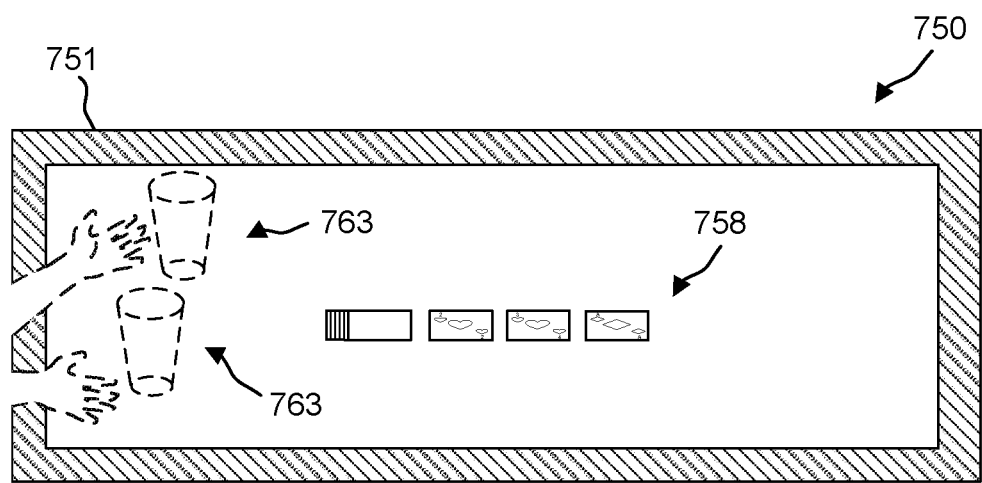

As previously described, in some cases, the virtual content in a virtual private space can be displayed with higher priority than real-world content. FIG. 7A-FIG. 7C are diagrams illustrating an example of a person 760 physically entering a virtual private space 750 of a virtual session being conducted in a restaurant (similar to the example of FIG. 4). As shown in FIG. 7A, the virtual private space 750 includes virtual content 758 and boundary virtual content 751. The virtual private space 750 is displayed as an overlay over a physical object (not shown in FIG. 7A), such as a table (similar to the table 459 shown in FIG. 4). The person 760 approaches the virtual private space 750 and places a beverage 763 and a beverage 764 on the physical object on which the virtual content of the virtual private space 750 is displayed. The beverages 763 and 764 can interfere with a view of the virtual content by authorized users of the virtual private space 750.

An XR device (e.g., the extended reality system 100) of an authorized user of the virtual private space 750 and/or a server in communication with the XR device can de-emphasize the beverages 763 and 764 and/or parts of the unauthorized user 760 while the beverages 763 and 764 and/or the parts of the unauthorized user 760 are located within the virtual private space 750. For example, as shown in FIG. 7B, the beverages 763 and 764 and the arms of the unauthorized user 760 are completely occluded so that the objects are transparent from the perspective of an authorized user viewing the virtual content in the virtual private space 750. In an AR system, the display is typically an optical see-through display, in which case a user of the AR system can see the physical world through the display and can also see virtual objects on the display. The virtual objects appear so that they are overlaid over the physical world. Physical objects can be made transparent from the AR system user's perspective by generating AR content that occludes the physical objects. In one illustrative example, a background model can be generated that models the background of a given environment. For instance, the background model can model the static portions of the restaurant in which the virtual session associated with the virtual private space 750 is being conducted. The beverages 763 and 764 and the arms of the unauthorized user 760 can be augmented (or occluded) with portions of the background model that correspond to the portion of the restaurant that is behind the beverages 763 and 764 and the arms of the unauthorized user 760, such that those portions of the background model are displayed in front of the beverages 763 and 764 and the arms of the unauthorized user 760. The frames being captured by the XR device of an authorized user viewing the virtual content of the virtual private space 750 can be repainted using the content (e.g., pixels) of those portions of the background model.

In some examples, an XR device of an authorized user participating in the virtual session associated with the virtual private space 750 can provide a visual, audible, or other type of indication of the location of the beverages 763 and 764 and the arms of the unauthorized user 760. For example, the XR device of the authorized user can display a notification on a display of the XR device that alerts the authorized user that the beverage 763 has been placed in the virtual private space 450.

FIG. 7C is a diagram illustrating another example of de-emphasize the beverages 763 and 764 and the arms of the unauthorized user 760 while the beverages 763 and 764 and the arms of the unauthorized user 760 are located within the virtual private space 750. As shown in FIG. 7C, the beverages 763 and 764 and the arms of the unauthorized user 760 are displayed with a modified appearance, so that the objects have less of a disruptive effect on the authorized users participating in the virtual session associated with the virtual private space 750. In some cases, an XR device of an authorized user can initially fully display the beverages 763 and 764 and the arms of the unauthorized user 760 within the virtual private space 750, and then gradually fade the display of the beverages 763 and 764 and the arms of the unauthorized user 760 until the objects are fully occluded.

The virtual private spaces described herein can provide various benefits in an AR and/or other XR environment. For example, as described above, a virtual private space can prevent the disruption of activities in a space that contains virtual content. The virtual private space can also prevent the viewing of virtual content by unauthorized users. In some cases, users that are authorized to view content in the virtual private space (referred to as authorized users) can be alerted that one or more unauthorized users are present or in proximity to the virtual private space. In some cases, an alert can be provided to an authorized user if the virtual content within the virtual private space is compromised in some manner (e.g., an unauthorized user affecting the real world space which results in some impact on the virtual content).

FIG. 8 is a flowchart illustrating an example of a process 800 for generating virtual content for one or more virtual private spaces using the techniques described herein. At block 802, the process 800 includes initiating, by a device, a virtual session for presenting virtual content. At block 804, the process 800 includes identifying, for the virtual session, a portion of a physical space for use as a virtual private space for presenting at least a portion of the virtual content. In one illustrative example, the virtual private space can include the virtual private space 450 shown in FIG. 4-FIG. 6.

At block 806, the process 800 includes outputting boundary information defining a boundary of the virtual private space. As described above, the boundary information can be used to generate the boundary virtual content defining the bounds of the virtual private space. In some examples, as described above, the boundary information includes world coordinates in the physical space and/or one or more feature points in at least one image of the physical space usable to generate the boundary virtual content identifying the boundary for the virtual private space. In some examples, the process 800 includes outputting the boundary virtual content identifying the boundary or bounds for the virtual private space. The boundary virtual content is viewable by one or more unauthorized users of the virtual session.

At block 808, the process 800 includes generating at least the portion of the virtual content for the virtual private space. In some cases, the entire virtual content can be generated for the virtual private space. In some cases, a portion of the virtual content (less than the entire virtual content) can be generated for the virtual private space. For example, a first portion of the virtual content can extend beyond the boundary of the virtual private space and more sensitive content (e.g., as defined by an authorized user, as defined by a content provider associated with the virtual session, or otherwise defined as sensitive) can be confined within boundary of the virtual private space. At least the portion of the virtual content is viewable in the virtual private space by one or more authorized users of the virtual session is not viewable by the one or more unauthorized users. For example, an extended reality device or other device of each of the one or more authorized users is authenticated or otherwise authorized to display at least the portion of the virtual content, and an extended reality device or other device of each of the one or more unauthorized users is not authenticated or otherwise authorized to display at least the portion of the virtual content. In some examples, at least the portion of the virtual content is not viewable by the one or more unauthorized users based on the boundary virtual content associated with the boundary information. In some cases, a real world volume defined within the boundary virtual content is not viewable by the one or more unauthorized users based on the boundary virtual content associated with the boundary information.

In some examples, the process 800 includes receiving an indication that an unauthorized user has entered the virtual private space. Based on the indication that the unauthorized user has entered the virtual private space, the process 800 can occlude at least a portion of the unauthorized user from being viewable in the virtual private space by the one or more authorized users.

In some examples, the process 800 receiving an indication that an unauthorized user has entered or is within a threshold distance of entering the virtual private space. Based on the indication that the unauthorized user has entered or is within the threshold distance of entering the virtual private space, the process 800 can move one or more virtual objects in the virtual private space to avoid at least a portion of the unauthorized user.

In some examples, the process 800 includes receiving an indication that an unauthorized user has entered or is within a threshold distance of entering the virtual private space. Based on the indication that the unauthorized user has entered or is within the threshold distance of entering the virtual private space, the process 800 can output a notification indicating a presence of the virtual private space. In some cases, outputting the notification includes sending the notification to a device of the unauthorized user, outputting an audio notification indicating the presence of the virtual private space, a combination thereof, and/or outputting another type of notification (such as those described herein). In some cases, the notification includes an outline of the unauthorized user.

In some examples, the process 800 includes receiving an indication that an unauthorized user has entered or is within a threshold distance of entering the virtual private space. Based on the indication that the unauthorized user has entered or is within the threshold distance of entering the virtual private space, the process 800 can output a notification to one or more devices of the one or more authorized users indicating that the unauthorized user has entered or is within the threshold distance of entering the virtual private space. In some cases, outputting the notification includes sending the notification to a device of at least one of the one or more authorized users, outputting an audio notification indicating the presence of the unauthorized user, a combination thereof, and/or outputting another type of notification (such as those described herein). In some cases, the notification includes an outline of the unauthorized user.

In some examples, the device is an extended reality device that includes one or more displays, one or more receivers (that can receive data and/or other information), one or more transmitters (that can transmit data and/or other information), and/or one or more transceivers (that can receive and transmit data and/or other information). In some examples, the process 800 includes displaying, by the extended reality device (e.g., by a display of the extended reality device), at least the portion of the virtual content.

In some examples, the device is a first extended reality device (including one or more displays, one or more receivers, one or more transmitters, and/or one or more transceivers). In some examples, the process 800 includes outputting (e.g., using the one or more receivers, the one or more transmitters, and/or the one or more transceivers) at least the portion of the virtual content to a second extended reality device. The second extended reality device can be used by an authorized user.

In some examples, the device is a first extended reality device (including one or more displays, one or more receivers, one or more transmitters, and/or one or more transceivers). In some examples, the process 800 includes displaying, by the first extended reality device (e.g., by a display of the extended reality device), at least the portion of the virtual content, and outputting (e.g., using the one or more receivers, the one or more transmitters, and/or the one or more transceivers) at least the portion of the virtual content to the second extended reality device.

In some examples, the process 800 includes displaying device, by the first extended reality device (e.g., by a display of the extended reality device), at least the portion of the virtual content, and outputting, by the first extended reality device (e.g., using the one or more receivers, the one or more transmitters, and/or the one or more transceivers), at least the portion of the virtual content to the second extended reality device. In some examples, the process 800 includes receiving, by the second extended reality device (e.g., using one or more receivers, one or more transmitters, and/or one or more transceivers of the second extended reality device), the boundary information, and generating, by the second extended reality device (e.g., using one or more processors of the second extended reality device), the virtual boundary content from the received boundary information.

In some examples, the device or one or more of apparatuses is a server device. In some examples, the process 800 includes outputting, by the server device (e.g., using one or more receivers, one or more transmitters, and/or one or more transceivers of the server device), at least the portion of the virtual content to an extended reality device.

In some examples, the processes described herein (e.g., process 800 and/or other process described herein) may be performed by a computing device or apparatus. In one example, the process 800 can be performed by the extended reality system 100 of FIG. 1. In another example, the process 800 can be performed by a computing device with the computing system 900 shown in FIG. 9. For instance, a computing device with the computing architecture shown in FIG. 9 can include the components of the extended reality system 100 of FIG. 1 and can implement the operations of FIG. 8.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 800. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
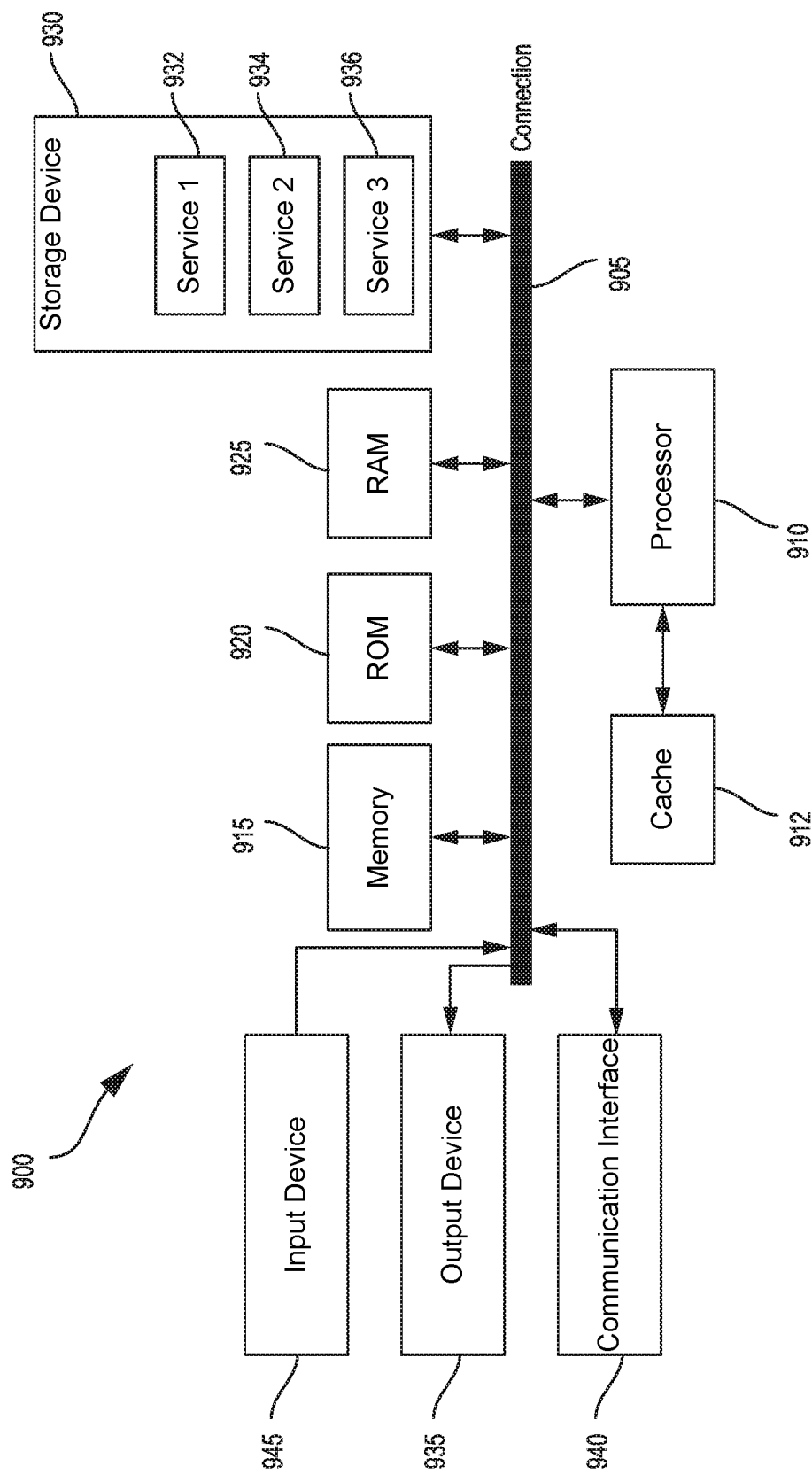
FIG. 9 illustrates an example computing system, in accordance with some examples of the present disclosure.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Example 1: A method generating virtual content. The method includes: initiating, by a device, a virtual session for presenting virtual content; identifying, for the virtual session, a portion of a physical space for use as a virtual private space for presenting at least a portion of the virtual content; outputting boundary information defining a boundary of the virtual private space; and generating at least the portion of the virtual content for the virtual private space, at least the portion of the virtual content being viewable in the virtual private space by one or more authorized users of the virtual session and not being viewable by one or more unauthorized users.

Example 2: A method according to Example 1, wherein at least the portion of the virtual content is not viewable by the one or more unauthorized users based on the boundary virtual content associated with the boundary information.

Example 3: A method according to any of Examples 1 or 2, wherein a real world volume defined within the boundary virtual content is not viewable by the one or more unauthorized users based on the boundary virtual content associated with the boundary information.

Example 4: A method according to any of Examples 1 to 3, further comprising outputting boundary virtual content identifying the boundary for the virtual private space, the boundary virtual content being viewable by the one or more unauthorized users of the virtual session.

Example 5: A method according to any of Examples 1 to 4, wherein the boundary information includes at least one of world coordinates in the physical space and one or more feature points in at least one image of the physical space usable to generate the boundary virtual content identifying the boundary for the virtual private space.

Example 6: A method according to any of Examples 1 to 5, receiving an indication that an unauthorized user has entered the virtual private space; and based on the indication that the unauthorized user has entered the virtual private space, occluding at least a portion of the unauthorized user from being viewable in the virtual private space by the one or more authorized users.

Example 7: A method according to any of Examples 1 to 6, further comprising: receiving an indication that an unauthorized user has entered or is within a threshold distance of entering the virtual private space; and based on the indication that the unauthorized user has entered or is within the threshold distance of entering the virtual private space, moving one or more virtual objects in the virtual private space to avoid at least a portion of the unauthorized user.

Example 8: A method according to any of Examples 1 to 7, further comprising: receiving an indication that an unauthorized user has entered or is within a threshold distance of entering the virtual private space; and based on the indication that the unauthorized user has entered or is within the threshold distance of entering the virtual private space, outputting a notification indicating a presence of the virtual private space.

Example 9: A method according to Example 8, wherein outputting the notification includes at least one of sending the notification to a device of the unauthorized user and outputting an audio notification indicating the presence of the virtual private space.

Example 10: A method according to any of Examples 1 to 9, further comprising: receiving an indication that an unauthorized user has entered or is within a threshold distance of entering the virtual private space; and based on the indication that the unauthorized user has entered or is within the threshold distance of entering the virtual private space, outputting a notification to one or more devices of the one or more authorized users indicating that the unauthorized user has entered or is within the threshold distance of entering the virtual private space.

Example 11: A method according to Example 10, wherein the notification includes an outline of the unauthorized user.

Example 12: A method according to any of Examples 1 to 11, wherein the device is an extended reality device, further comprising: displaying, by the extended reality device, at least the portion of the virtual content.

Example 13: A method according to any of Examples 1 to 12, wherein the device is a first extended reality device, and further comprising: outputting at least the portion of the virtual content to a second extended reality device.

Example 14: A method according to any of Examples 1 to 13, wherein the device is a first extended reality device, and further comprising: displaying, by the first extended reality device, at least the portion of the virtual content; and outputting at least the portion of the virtual content to a second extended reality device.

Example 15: A method according to any of Examples 1 to 14, wherein the device is a first extended reality device, and further comprising: displaying, by the first extended reality device, at least the portion of the virtual content; outputting at least the portion of the virtual content to a second extended reality device; receiving, by the second extended reality device, the boundary information; and generating, by the second extended reality device, the virtual boundary content from the received boundary information.

Example 16: A method according to any of Examples 1 to 15, wherein the device is a server device, and further comprising: outputting, by the server device, at least the portion of the virtual content to an extended reality device.

Example 17: An apparatus for generating virtual content. The apparatus includes a memory configured to store virtual content; and one or more processors coupled to the memory and configured to: initiate a virtual session for presenting virtual content; identify, for the virtual session, a portion of a physical space for use as a virtual private space for presenting at least a portion of the virtual content; output boundary information defining a boundary of the virtual private space; and generate at least the portion of the virtual content for the virtual private space, at least the portion of the virtual content being viewable in the virtual private space by one or more authorized users of the virtual session and not being viewable by one or more unauthorized users.

Example 18: An apparatus according to Example 17, wherein at least the portion of the virtual content is not viewable by the one or more unauthorized users based on the boundary virtual content associated with the boundary information.

Example 19: An apparatus according to any of Examples 17 or 18, wherein a real world volume defined within the boundary virtual content is not viewable by the one or more unauthorized users based on the boundary virtual content associated with the boundary information.

Example 20: An apparatus according to any of Examples 17 to 19, wherein the one or more processors are configured to output boundary virtual content identifying the boundary for the virtual private space, the boundary virtual content being viewable by the one or more unauthorized users of the virtual session.

Example 21: An apparatus according to any of Examples 17 to 20, wherein the boundary information includes at least one of world coordinates in the physical space and one or more feature points in at least one image of the physical space usable to generate the boundary virtual content identifying the boundary for the virtual private space.

Example 22: An apparatus according to any of Examples 17 to 21, wherein the one or more processors are configured to: receive an indication that an unauthorized user has entered the virtual private space; and based on the indication that the unauthorized user has entered the virtual private space, occlude at least a portion of the unauthorized user from being viewable in the virtual private space by the one or more authorized users.

Example 23: An apparatus according to any of Examples 17 to 22, further comprising: receive an indication that an unauthorized user has entered or is within a threshold distance of entering the virtual private space; and based on the indication that the unauthorized user has entered or is within the threshold distance of entering the virtual private space, move one or more virtual objects in the virtual private space to avoid at least a portion of the unauthorized user.

Example 24: An apparatus according to any of Examples 17 to 23, wherein the one or more processors are configured to: receive an indication that an unauthorized user has entered or is within a threshold distance of entering the virtual private space; and based on the indication that the unauthorized user has entered or is within the threshold distance of entering the virtual private space, output a notification indicating a presence of the virtual private space.

Example 25: An apparatus according to Example 24, wherein outputting the notification includes at least one of sending the notification to a device of the unauthorized user and outputting an audio notification indicating the presence of the virtual private space.

Example 26: An apparatus according to any of Examples 17 to 25, wherein the one or more processors are configured to: receive an indication that an unauthorized user has entered or is within a threshold distance of entering the virtual private space; and based on the indication that the unauthorized user has entered or is within the threshold distance of entering the virtual private space, output a notification to one or more devices of the one or more authorized users indicating that the unauthorized user has entered or is within the threshold distance of entering the virtual private space.

Example 27: An apparatus according to Example 26, wherein the notification includes an outline of the unauthorized user.

Example 28: An apparatus according to any of Examples 17 to 27, wherein the apparatus is a first extended reality device, and wherein the one or more processors are configured to: cause at least the portion of the virtual content to be output to a second extended reality device.

Example 29: An apparatus according to any of Examples 17 to 28, wherein the apparatus is an extended reality device.

Example 30: An apparatus according to any of Examples 17 to 29, further comprising a display.

Example 31: An apparatus according to Example 30, wherein the display is configured to display at least the portion of the virtual content.

Example 32: An apparatus according to Example 30, wherein the apparatus is a first extended reality device, and wherein: the display is configured to display at least the portion of the virtual content; and the one or more processors are configured to output at least the portion of the virtual content to a second extended reality device.

Example 33: An apparatus according to Example 30, wherein the apparatus is a first extended reality device, and wherein: the display is configured to display at least the portion of the virtual content; the one or more processors are configured to output at least the portion of the virtual content to a second extended reality device; the second extended reality device is configured to receive the boundary information; and the second extended reality device is configured to generate the virtual boundary content from the received boundary information.

Example 34: An apparatus according to any of Examples 17 to 33, wherein the apparatus is a server device, and wherein the one or more processors are configured to: output, by the server device, at least the portion of the virtual content to an extended reality device.

Example 35: A non-transitory computer-readable medium of an extended reality system having stored thereon instructions that, when executed by one or more processors, cause the one or more processors to perform any of the operations of examples 1 to 16.

Example 35: An extended reality system including one or more means for performing any of the operations of examples 1 to 16.

What is claimed is:

1. A method of generating virtual content, the method comprising:
   initiating, by a device, a virtual session for presenting virtual content;
   identifying, for the virtual session, a portion of a physical space for use as a virtual private space for presenting at least a portion of the virtual content;
   outputting boundary virtual content identifying a boundary of the virtual private space, the boundary virtual content being viewable by one or more unauthorized users of the virtual session; and
   generating at least the portion of the virtual content for the virtual private space, wherein the boundary virtual content is configured to block the portion of the physical space such that at least the portion of the virtual content is viewable in the virtual private space by one or more authorized users of the virtual session and is not viewable by the one or more unauthorized users of the virtual session.

2. The method of claim 1, wherein a real world volume defined within the boundary virtual content is not viewable by the one or more unauthorized users based on the boundary virtual content.

3. The method of claim 1, further comprising:
   outputting at least one of world coordinates in the physical space or one or more feature points of at least one physical object in at least one image of the physical space usable to generate the boundary virtual content identifying the boundary for the virtual private space.

4. The method of claim 1, further comprising:
   receiving an indication that an unauthorized user has entered the virtual private space; and
   based on the indication that the unauthorized user has entered the virtual private space, occluding at least a portion of the unauthorized user from being viewable in the virtual private space by the one or more authorized users.

5. The method of claim 1, further comprising:
   receiving an indication that an unauthorized user has entered or is within a threshold distance of entering the virtual private space; and
   based on the indication that the unauthorized user has entered or is within the threshold distance of entering the virtual private space, moving one or more virtual objects in the virtual private space to avoid at least a portion of the unauthorized user.

6. The method of claim 1, further comprising:
   receiving an indication that an unauthorized user has entered or is within a threshold distance of entering the virtual private space; and
   based on the indication that the unauthorized user has entered or is within the threshold distance of entering the virtual private space, outputting a notification indicating a presence of the virtual private space.

7. The method of claim 6, wherein outputting the notification includes at least one of sending the notification to a device of the unauthorized user or outputting an audio notification indicating the presence of the virtual private space.

8. The method of claim 1, further comprising:
   receiving an indication that an unauthorized user has entered or is within a threshold distance of entering the virtual private space; and
   based on the indication that the unauthorized user has entered or is within the threshold distance of entering the virtual private space, outputting a notification to one or more devices of the one or more authorized users indicating that the unauthorized user has entered or is within the threshold distance of entering the virtual private space.

9. The method of claim 8, wherein the notification includes an outline of the unauthorized user.

10. The method of claim 1, wherein the device is an extended reality device, and further comprising:
    displaying, by the extended reality device, at least the portion of the virtual content.

11. The method of claim 1, wherein the device is a first extended reality device, and further comprising:
    outputting at least the portion of the virtual content to a second extended reality device.

12. The method of claim 1, wherein the device is a first extended reality device, and further comprising:
    displaying, by the first extended reality device, at least the portion of the virtual content; and
    outputting at least the portion of the virtual content to a second extended reality device.

13. The method of claim 1, wherein the device is a first extended reality device, and further comprising:
    displaying, by the first extended reality device, at least the portion of the virtual content;
    outputting at least the portion of the virtual content to a second extended reality device;
    receiving, by the second extended reality device, boundary information; and
    generating, by the second extended reality device, the boundary virtual content from the received boundary information.

14. The method of claim 1, wherein the device is a server device, and further comprising:
    outputting, by the server device, at least the portion of the virtual content to an extended reality device.

15. An apparatus for generating virtual content, comprising:
    a memory configured to store virtual content; and
    one or more processors coupled to the memory and configured to:
    initiate a virtual session for presenting virtual content;
    identify, for the virtual session, a portion of a physical space for use as a virtual private space for presenting at least a portion of the virtual content;
    output boundary virtual content identifying a boundary of the virtual private space, the boundary virtual content being viewable by one or more unauthorized users of the virtual session; and
    generate at least the portion of the virtual content for the virtual private space, wherein the boundary virtual content is configured to block the portion of the physical space such that at least the portion of the virtual content is viewable in the virtual private space by one or more authorized users of the virtual session and is not viewable by the one or more unauthorized users of the virtual session.

16. The apparatus of claim 15, wherein a real world volume defined within the boundary virtual content is not viewable by the one or more unauthorized users based on the boundary virtual content.

17. The apparatus of claim 15, wherein the at least one processor is configured to output at least one of world coordinates in the physical space or one or more feature points of at least one physical object in at least one image of the physical space usable to generate the boundary virtual content identifying the boundary for the virtual private space.

18. The apparatus of claim 15, wherein the one or more processors are configured to:
receive an indication that an unauthorized user has entered the virtual private space; and
based on the indication that the unauthorized user has entered the virtual private space, occlude at least a portion of the unauthorized user from being viewable in the virtual private space by the one or more authorized users.

19. The apparatus of claim 15, further comprising:
receive an indication that an unauthorized user has entered or is within a threshold distance of entering the virtual private space; and
based on the indication that the unauthorized user has entered or is within the threshold distance of entering the virtual private space, move one or more virtual objects in the virtual private space to avoid at least a portion of the unauthorized user.

20. The apparatus of claim 15, wherein the one or more processors are configured to:
receive an indication that an unauthorized user has entered or is within a threshold distance of entering the virtual private space; and
based on the indication that the unauthorized user has entered or is within the threshold distance of entering the virtual private space, output a notification indicating a presence of the virtual private space.

21. The apparatus of claim 20, wherein outputting the notification includes at least one of sending the notification to a device of the unauthorized user or outputting an audio notification indicating the presence of the virtual private space.

22. The apparatus of claim 15, wherein the one or more processors are configured to:
receive an indication that an unauthorized user has entered or is within a threshold distance of entering the virtual private space; and
based on the indication that the unauthorized user has entered or is within the threshold distance of entering the virtual private space, output a notification to one or more devices of the one or more authorized users indicating that the unauthorized user has entered or is within the threshold distance of entering the virtual private space.

23. The apparatus of claim 22, wherein the notification includes an outline of the unauthorized user.

24. The apparatus of claim 15, wherein the apparatus is a first extended reality device, and wherein the one or more processors are configured to:
cause at least the portion of the virtual content to be output to a second extended reality device.

25. The apparatus of claim 15, wherein the apparatus is an extended reality device.

26. The apparatus of claim 15, further comprising a display.

27. The apparatus of claim 26, wherein the display is configured to display at least the portion of the virtual content.

28. The apparatus of claim 26, wherein the apparatus is a first extended reality device, and wherein:
the display is configured to display at least the portion of the virtual content; and
the one or more processors are configured to output at least the portion of the virtual content to a second extended reality device.

29. The apparatus of claim 26, wherein the apparatus is a first extended reality device, and wherein:
the display is configured to display at least the portion of the virtual content;
the one or more processors are configured to output at least the portion of the virtual content to a second extended reality device;
the second extended reality device is configured to receive boundary information; and
the second extended reality device is configured to generate the boundary virtual content from the received boundary information.

30. The apparatus of claim 15, wherein the apparatus is a server device, and wherein the one or more processors are configured to:
output, by the server device, at least the portion of the virtual content to an extended reality device.

31. A non-transitory computer-readable medium having stored thereon instructions that, when executed by one or more processors, cause the one or more processors to:
initiate a virtual session for presenting virtual content;
identify, for the virtual session, a portion of a physical space for use as a virtual private space for presenting at least a portion of the virtual content;
output boundary virtual content identifying a boundary of the virtual private space, the boundary virtual content being viewable by one or more unauthorized users of the virtual session; and
generate at least the portion of the virtual content for the virtual private space, wherein the boundary virtual content is configured to block the portion of the physical space such that at least the portion of the virtual content is viewable in the virtual private space by one or more authorized users of the virtual session and is not viewable by the one or more unauthorized users of the virtual session.

32. The non-transitory computer-readable medium of claim 31, further comprising instructions that, when executed by the one or more processors, cause the one or more processors to output at least one of world coordinates in the physical space or one or more feature points of at least one physical object in at least one image of the physical space usable to generate the boundary virtual content identifying the boundary for the virtual private space.

33. The non-transitory computer-readable medium of claim 31, wherein a real world volume defined within the boundary virtual content is not viewable by the one or more unauthorized users based on the boundary virtual content.

34. The non-transitory computer-readable medium of claim 31, further comprising instructions that, when executed by the one or more processors, cause the one or more processors to:
receive an indication that an unauthorized user has entered the virtual private space; and
based on the indication that the unauthorized user has entered the virtual private space, occlude at least a portion of the unauthorized user from being viewable in the virtual private space by the one or more authorized users.

35. The non-transitory computer-readable medium of claim 31, further comprising instructions that, when executed by the one or more processors, cause the one or more processors to:

receive an indication that an unauthorized user has entered or is within a threshold distance of entering the virtual private space; and based on the indication that the unauthorized user has entered or is within the threshold distance of entering the virtual private space, move one or more virtual objects in the virtual private space to avoid at least a portion of the unauthorized user.

\* \* \* \* \*